United States Patent
Gray et al.

(10) Patent No.: US 9,658,880 B2
(45) Date of Patent: May 23, 2017

(54) EFFICIENT GARBAGE COLLECTION AND EXCEPTION HANDLING IN A HARDWARE ACCELERATED TRANSACTIONAL MEMORY SYSTEM

(71) Applicant: Microsoft Technology Licensing, LLC, Redmond, WA (US)

(72) Inventors: Jan Gray, Bellevue, WA (US); Martin Taillefer, Redmond, WA (US); Yosseff Levanoni, Redmond, WA (US); Ali-Reza Adl-Tabatabai, San Jose, CA (US); Dave Detlefs, Issaquah, WA (US); Vinod K. Grover, Mercer Island, WA (US); Michael Magruder, Carnation, WA (US); Gad Sheaffer, Haifa (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 13/845,467

(22) Filed: Mar. 18, 2013

(65) Prior Publication Data
US 2013/0238579 A1    Sep. 12, 2013

Related U.S. Application Data

(63) Continuation of application No. 12/638,929, filed on Dec. 15, 2009, now Pat. No. 8,402,218.

(51) Int. Cl.
G06F 12/00     (2006.01)
G06F 13/00     (2006.01)
(Continued)

(52) U.S. Cl.
CPC ............ *G06F 9/466* (2013.01); *G06F 9/3004* (2013.01); *G06F 9/30087* (2013.01);
(Continued)

(58) Field of Classification Search
CPC .. G06F 12/0253; G06F 12/082; G06F 9/3004; G06F 9/30087; G06F 9/30185;
(Continued)

(56) References Cited

U.S. PATENT DOCUMENTS

| 4,442,487 A | 4/1984 | Fletcher |
| 5,394,555 A | 2/1995 | Hunter |

(Continued)

OTHER PUBLICATIONS

U.S. Appl. No. 13/554,558, May 1, 2013, Office Action
(Continued)

*Primary Examiner* — Sheng-Jen Tsai
(74) *Attorney, Agent, or Firm* — Workman Nydegger

(57) ABSTRACT

Handling garbage collection and exceptions in hardware assisted transactions. Embodiments are practiced in a computing environment including a hardware assisted transaction system. A method includes beginning a hardware assisted transaction, raising an exception while in the hardware assisted transaction, including creating an exception object, determining that the transaction should be rolled back, and as a result of determining that the transaction should be rolled back, marshaling the exception object out of the hardware assisted transaction.

20 Claims, 6 Drawing Sheets

(51) Int. Cl.
| | | |
|---|---|---|
| *G06F 13/28* | (2006.01) | |
| *G06F 9/46* | (2006.01) | |
| *G06F 9/30* | (2006.01) | |
| *G06F 9/38* | (2006.01) | |
| *G06F 12/02* | (2006.01) | |
| *G06F 12/0817* | (2016.01) | |
| *G06F 12/0815* | (2016.01) | |

(52) U.S. Cl.
CPC ........ *G06F 9/30185* (2013.01); *G06F 9/3834* (2013.01); *G06F 9/467* (2013.01); *G06F 12/0253* (2013.01); *G06F 12/082* (2013.01); *G06F 12/0815* (2013.01)

(58) Field of Classification Search
CPC ........ G06F 9/3834; G06F 9/466; G06F 9/467; G06F 12/0815
USPC .................................................. 711/154, 115
See application file for complete search history.

(56) References Cited

U.S. PATENT DOCUMENTS

| | | | |
|---|---|---|---|
| 5,404,555 | A | 4/1995 | Liu |
| 5,428,761 | A | 6/1995 | Herlihy et al. |
| 5,768,500 | A | 6/1998 | Agrawal |
| 5,835,764 | A | 11/1998 | Platt |
| 5,933,632 | A | 8/1999 | Cahill, III |
| 6,105,147 | A * | 8/2000 | Molloy .......................... 714/16 |
| 6,272,607 | B1 | 8/2001 | Baentsch et al. |
| 6,314,563 | B1 | 11/2001 | Agensen |
| 6,665,704 | B1 | 12/2003 | Singh |
| 6,751,617 | B1 | 6/2004 | Anfindsen |
| 6,842,830 | B2 | 1/2005 | Khare |
| 6,845,430 | B2 | 1/2005 | Hopeman |
| 6,862,635 | B1 | 3/2005 | Alverson |
| 6,871,264 | B2 | 3/2005 | Soltis |
| 6,898,609 | B2 | 5/2005 | Kerwin |
| 6,938,128 | B1 | 8/2005 | Kuskin et al. |
| 6,976,155 | B2 | 12/2005 | Drysdale |
| 7,111,294 | B2 | 9/2006 | Steensgaard |
| 7,127,561 | B2 | 10/2006 | Hill |
| 7,162,512 | B1 | 1/2007 | Amit |
| 7,181,578 | B1 | 2/2007 | Guha |
| 7,207,034 | B2 * | 4/2007 | Burke et al. ................... 717/110 |
| 7,210,145 | B2 | 4/2007 | Srinivasan |
| 7,213,106 | B1 | 5/2007 | Koster |
| 7,246,123 | B2 | 7/2007 | Carr |
| 7,284,091 | B2 | 10/2007 | Chow et al. |
| 7,320,065 | B2 | 1/2008 | Gosior |
| 7,343,476 | B2 | 3/2008 | Floyd et al. |
| 7,376,800 | B1 | 5/2008 | Choquette |
| 7,395,382 | B1 | 7/2008 | Moir |
| 7,406,698 | B2 | 7/2008 | Richardson |
| 7,421,544 | B1 | 9/2008 | Wright et al. |
| 7,467,323 | B2 | 12/2008 | Fields |
| 7,478,210 | B2 | 1/2009 | Saha |
| 7,502,897 | B2 | 3/2009 | Hertzberg |
| 7,512,636 | B2 | 3/2009 | Verma |
| 7,516,366 | B2 | 4/2009 | Lev |
| 7,548,919 | B2 | 6/2009 | Gupta et al. |
| 7,584,232 | B2 | 9/2009 | Guo |
| 7,711,909 | B1 | 5/2010 | Lev et al. |
| 7,856,537 | B2 | 12/2010 | Kumar |
| 7,860,847 | B2 | 12/2010 | Detlefs et al. |
| 7,991,966 | B2 | 8/2011 | Sistla |
| 8,095,824 | B2 | 1/2012 | Gray |
| 8,229,907 | B2 | 7/2012 | Gray |
| 8,799,582 | B2 | 8/2014 | Sheaffer et al. |
| 2003/0018860 | A1 | 1/2003 | Kruger |
| 2003/0055807 | A1 | 3/2003 | Lomet |
| 2003/0145136 | A1 | 7/2003 | Tierney et al. |
| 2003/0177182 | A1 * | 9/2003 | Clark et al. ................... 709/203 |
| 2003/0188300 | A1 | 10/2003 | Patrudu |
| 2004/0019898 | A1 * | 1/2004 | Frey et al. ..................... 719/330 |
| 2004/0162951 | A1 | 8/2004 | Jacobson et al. |
| 2004/0243868 | A1 | 12/2004 | Toll et al. |
| 2004/0268187 | A1 * | 12/2004 | Burke et al. ................... 714/40 |
| 2005/0060495 | A1 | 3/2005 | Pistoulet |
| 2005/0086648 | A1 * | 4/2005 | Andrews et al. .............. 717/135 |
| 2005/0204088 | A1 | 9/2005 | Ho et al. |
| 2005/0228952 | A1 | 10/2005 | Mayhew et al. |
| 2005/0246487 | A1 | 11/2005 | Ergan |
| 2006/0074736 | A1 * | 4/2006 | Shukla et al. ................... 705/8 |
| 2006/0085591 | A1 | 4/2006 | Kumar |
| 2007/0143287 | A1 | 6/2007 | Adl-Tabatabai |
| 2007/0143741 | A1 | 6/2007 | Harris |
| 2007/0156780 | A1 * | 7/2007 | Saha ........................ G06F 9/467 |
| 2007/0156971 | A1 | 7/2007 | Sistla et al. |
| 2007/0156994 | A1 | 7/2007 | Akkary |
| 2007/0186056 | A1 | 8/2007 | Saha et al. |
| 2007/0198792 | A1 | 8/2007 | Dice |
| 2007/0198979 | A1 | 8/2007 | Dice |
| 2007/0239943 | A1 | 10/2007 | Dice |
| 2007/0245099 | A1 | 10/2007 | Gray |
| 2007/0245128 | A1 | 10/2007 | Gray |
| 2007/0260608 | A1 | 11/2007 | Hertzberg |
| 2007/0260942 | A1 | 11/2007 | Rajwar |
| 2008/0021934 | A1 | 1/2008 | Hudson |
| 2008/0040551 | A1 * | 2/2008 | Gray et al. ................... 711/130 |
| 2008/0082693 | A1 * | 4/2008 | Meijer et al. ................. 709/247 |
| 2008/0098374 | A1 | 4/2008 | Adl-tabatabai et al. |
| 2008/0127035 | A1 | 5/2008 | Lev |
| 2008/0162886 | A1 | 7/2008 | Saha |
| 2008/0163220 | A1 * | 7/2008 | Wang et al. ................... 718/101 |
| 2008/0256074 | A1 | 10/2008 | Lev et al. |
| 2008/0270745 | A1 | 10/2008 | Saha |
| 2008/0294883 | A1 * | 11/2008 | Yajaman ............. G06F 9/44526 712/244 |
| 2009/0006407 | A1 | 1/2009 | Magruder |
| 2009/0006467 | A1 | 1/2009 | Visscher |
| 2009/0006751 | A1 * | 1/2009 | Taillefer et al. .............. 711/121 |
| 2009/0006767 | A1 | 1/2009 | Saha |
| 2009/0007107 | A1 * | 1/2009 | Taillefer et al. ................. 718/1 |
| 2009/0007119 | A1 | 1/2009 | Blumrich |
| 2009/0019231 | A1 | 1/2009 | Cypher |
| 2009/0063780 | A1 | 3/2009 | Terechko |
| 2009/0070774 | A1 | 3/2009 | Raikin et al. |
| 2009/0089520 | A1 | 4/2009 | Saha |
| 2009/0113443 | A1 | 4/2009 | Heller |
| 2009/0138670 | A1 | 5/2009 | Mutlu et al. |
| 2009/0165006 | A1 | 6/2009 | Ceze et al. |
| 2009/0172292 | A1 | 7/2009 | Saha |
| 2009/0172303 | A1 | 7/2009 | Welc |
| 2009/0172305 | A1 | 7/2009 | Shpeisman |
| 2009/0172306 | A1 | 7/2009 | Nussbaum |
| 2009/0172654 | A1 | 7/2009 | Zhao |
| 2009/0182956 | A1 | 7/2009 | Caprioli et al. |
| 2009/0204969 | A1 | 8/2009 | Abadi |
| 2009/0235237 | A1 | 9/2009 | Song et al. |
| 2009/0235262 | A1 | 9/2009 | Ceze et al. |
| 2009/0260011 | A1 | 10/2009 | Snover |
| 2009/0282386 | A1 | 11/2009 | Moir et al. |
| 2009/0327538 | A1 | 12/2009 | Iwatsuki |
| 2010/0023706 | A1 * | 1/2010 | Christie et al. ................ 711/150 |
| 2010/0122073 | A1 * | 5/2010 | Narayanaswamy et al. . 712/244 |
| 2010/0131953 | A1 | 5/2010 | Dice |
| 2010/0138841 | A1 | 6/2010 | Dice et al. |
| 2010/0162249 | A1 | 6/2010 | Shpeisman |
| 2010/0169382 | A1 | 7/2010 | Sheaffer |
| 2010/0169579 | A1 | 7/2010 | Sheaffer |
| 2010/0169580 | A1 | 7/2010 | Sheaffer |
| 2010/0169581 | A1 | 7/2010 | Sheaffer et al. |
| 2010/0218195 | A1 * | 8/2010 | Adl-Tabatabai et al. ..... 718/107 |
| 2010/0229043 | A1 | 9/2010 | Saha |
| 2010/0325630 | A1 | 12/2010 | Flood |
| 2010/0332538 | A1 | 12/2010 | Gray |
| 2010/0332716 | A1 | 12/2010 | Sheaffer |
| 2010/0332721 | A1 | 12/2010 | Yamada |
| 2010/0332753 | A1 | 12/2010 | Gray |
| 2010/0332768 | A1 | 12/2010 | Gray |
| 2010/0332771 | A1 | 12/2010 | Gray |
| 2010/0332807 | A1 | 12/2010 | Sheaffer |
| 2010/0332808 | A1 | 12/2010 | Adl-Tabatabai |

(56) References Cited

U.S. PATENT DOCUMENTS

| | | | |
|---|---|---|---|
| 2011/0099335 A1* | 4/2011 | Scott et al. | 711/141 |
| 2011/0145304 A1 | 6/2011 | Gray | |
| 2011/0145498 A1 | 6/2011 | Taillefer | |
| 2011/0145552 A1 | 6/2011 | Yamada et al. | |
| 2011/0145553 A1 | 6/2011 | Levanoni | |
| 2011/0145637 A1 | 6/2011 | Gray et al. | |
| 2011/0145802 A1 | 6/2011 | Levanoni | |
| 2012/0179877 A1 | 7/2012 | Shriraman et al. | |
| 2012/0246453 A1* | 9/2012 | Rozas et al. | 712/244 |
| 2012/0284485 A1 | 11/2012 | Yamada | |
| 2014/0325154 A1 | 10/2014 | Gray | |

OTHER PUBLICATIONS

Notice of Allowance dated Jun. 24, 2013 cited in U.S. Appl. No. 12/638,103.
Notice of Allowance dated Apr. 14, 2014 cited in U.S. Appl. No. 12/493,164.
Notice of Allowance dated May 31, 2013 cited in U.S. Appl. No. 12/638,214.
Office Action dated Sep. 11, 2014 cited in U.S. Appl. No. 12/493,162.
Notice of Allowance dated Nov. 12, 2013 cited in U.S. Appl. No. 13/554,558.
Office Action dated Nov. 13, 2013 cited in U.S. Appl. No. 12/638,345.
Office Action dated Jul. 17, 2013 cited in U.S. Appl. No. 12/638,345.
Office Action dated Jun. 11, 2014 cited in U.S. Appl. No. 12/638,345.
Ananian; "Unbounded Transactional Memory"; 2009; pp. 1-12; http://supertech.csail.mit.edu/papers/xaction.ps.
Shriraman; "Hardware Acceleration of Software Transactional Memory"; Dec. 2005; pp. 1-22; https://urresearch.rochester.edu/retrieve/5518/05.tr887. Hardware_acceleration_of_software_transactional_memory.pdf.
Chaung; "Maintaining Safe Memory for Security, Debugging, and Multi-threading"; 2006; pp. 1-186; http://www.cse.ucsd.edu/Dienst/Repository/2.0/Body/ncstrl.ucsd_cse/CS2006-0873/postscript.
Yen; "LogTM-SE: Decoupling Hardware Transactional Memory from Caches"; Feb. 10-14, 2007; pp. 1-12; http://www.cs.wisc.edu/multifacet/papers/hpca07_logtmse.pdf.
Author Unknown; "CP3SP33 Connectivity Processor with Cache, DSP, and Bluetooth, USB, and Dual CAN Interfaces"; Jul. 2007; pp. 1-346; http://www.national.com/appinfo/cp3000/files/CP3SP33.pdf.
Abadi; "Transactional Memory with Strong Atomicity Using Off-the-Shelf Memory Protection Hardware"; 2009; pp. 1-11; http://research.microsoft.com/en-us/um/people/tharris/papers/2009-ppopp.pdf.
Moravan; "Supporting Nested Transactional Memory in LogTM"; Oct. 21-25, 2006; pp. 1- 12; http://www.cs.wisc.edu/multifacet/papers/asplos06_nested_logtm.pdf.
Author Unknown; "Extending Hardware Transactional Memory to Support Non-Busy Waiting and Non-Transactional Actions"; 2006; pp. 1-19; http://209.85.229.132/search?q=cache:-9KSLEk_CcIJ:www.cs.purdue.edu/homes/jv/events/TRANSACT/slides/zilles.pdf+non-transactional+instructions+and+abort&cd=3&hl=en&ct=clnk&gl=in.
Carlstrom; "The ATOMOΣ Transactional Programming Language"; Jun. 11-16, 2006; pp. 1-13; http://tcc.stanford.edu/publications/tcc_pldi2006.pdf.
Moss; "Open Nested Transactions; Semantics and Support"; 2006; pp. 1-8; http://www.cs.utah.edu/wmpi/2006/final-version/wmpi-posters-1-Moss.pdf.
Minh; "An Effective Hybrid Transactional Memory System with Strong Isolation Guarantees"; Jun. 9-13, 2007; pp. 1-12; http://tcc.stanford.edu/publications/tcc_isca2007.pdf.
Chong; "Scalable HMM based Inference Engine in LVCSR"; Mar. 31, 2009; 1 page; http://www.icsi.berkeley.edu/cgi-bin/events/event.pl?ID=000531.
Zeichick; "Massive Multi-Core Processors: The Gamer's Edge"; Oct. 4, 2007; pp. 1-2; http://developer.amd.com/documentation/articles/Pages/1042007177.aspx.
Vasantharam; "CSMP"; 2009; pp. 1-3; http://sourceforge.net/projects/mupisoft/.
Bracy; "Disintermediated Active Communication"—Nov. 9, 2006—pp. 1-4—http://ieeexplore.ieee.org/stamp/stamp.jsp?arnumber=04069172.
Shriraman; "Hardware Acceleration of Software Transactional Memory"—Dec. 2005—pp. 1-22—https://urresearch.rochester.edu/retrieve/5518/05.tr887.Hardware_acceleration_of_software_transactional_memory.pdf.
Sondag; "Predictive Thread-to-Core Assignment on a Heterogeneous Multi-Core Processor"—Oct. 18, 2007—pp. 1-5—http://citeseerx.ist.psu.edu/viewdoc/download?doi=10.1.1.90.9734&rep=rep1&type=pdf.
Zhao; "CacheScouts: Fine-Grain Monitoring of Shared Caches in CMP Platforms"—2007—pp. 1-11—http://www.cs.ucr.edu/~zhao/paper/Pact_CacheScout_2007.pdf.
Lilja; "Cache Coherence in Large-Scale Shared Memory Multiprocessors: Issues and Comparisons"—Sep. 1993—pp. 1-43—http://www.arctic.umn.edu/papers/coherence-survey.pdf.
Censier; "A New Solution to Coherence Problems in Multicache Systems"—Dec. 1978—pp. 1-7—http://citeseerx.ist.psu.edu/viewdoc/download?doi=10.1.1.111.7854&rep=rep1&type=pdf.
Papamarcos; "A Low-Overhead Coherence Solution for Multiprocessors with Private Cache Memories"—1984—pp. 348-354—http://www.csl.cornell.edu/courses/ece572/papamarcos.isca84.pdf.
Chuang; "Unbounded Page-Based Transactional Memory"—Oct. 21-25, 2006—pp. 1-12—http://www.cse.ucsd.edu/~wchuang/ASPLOS-06-PTM.pdf.
Swift; "OS Support for Virtualizing Hardware Transactional Memory"—2008—pp. 1-10—http://www.cs.wisc.edu/multifacet/papers/transact08_tvm.pdf.
Singh; "A Metadata Catalog Service for Data Intensive Applications"—Nov. 15-21, 2003—pp. 1-17—http://www.irit.fr/~Jean-Marc.Pierson/DEAGrids/2003-2004/DataandMetaDataManagement/mcs_sc2003.pdf.
Andrew; "A Dictionary of HTML META Tags"—Feb. 11, 2007—pp. 1-11—http://vancouver-webpages.com/META/metatags.detail.html.
Spear; "Implementing and Exploiting Inevitability in Software Transactional Memory"—2008—pp. 59-66—http://ieeexplore.ieee.org/stamp/stamp.jsp?arnumber=04625833.
Author Unknown; Wikipedia; "Software Transactional Memory"—May 7, 2009—pp. 1-7—http://en.wikipedia.org/wiki/Software_transactional_memory.
Zilles et al. "Extending Hardware Transactional Memory to Support Non-busy Waiting and Non-transactional Actions," Nov. 2006, pp. 1-10.
Joao; "Flexible Reference-Counting-Based Hardware Acceleration for Garbage Collection"—Published Jun. 20-24, 2009 pp. 1-11.
Grossman; "The Transactional Memory/Garbage Collection Analogy"—Published Oct. 21-25, 2007—pp. 1-12.
Adl-Tabatabai; "Unlocking Concurrency"—Published Dec./Jan. 2006-2007 pp. 25-33.
Carlstrom; "Executing Java Programs with Transactional Memory"—Published Mar. 26, 2007 pp. 1-32.
Diestelhorst—"Hardware Acceleration for lock-free data structures and software-transactional memory"—Published Aug. 14, 2008 pp. 1-8.
Harizopoulos—"Steps towards cache-resident transaction processing"—Published 2004 pp. 1- 12.
Lie—"Hardware Support for Unbounded Transactional Memory"—Published May 7, 2004 pp. 1-111.
Saha—"Architectural Support for Software Transactional Memory"—Published 2006 pp. 1-12.
Volos - "NePalTM: Design and Implementation of Nested Parallelism for Transactional Memory"—Published 2009, pp. 1-25.

(56) References Cited

OTHER PUBLICATIONS

Rothermel—"Concurrency Control Issues in Nested Transactions"—Published 1992, pp. 1-36.
Author Unknown—".NET Framework 4 Beta 1 enabled to use Software Transactional Memory (STM.NET Version 1.0)"—Published Jul. 24, 2009; pp. 1-84.
Nyte—"Nesting Models in Software Transactional Memory"—Published Sep. 14, 2007; pp. 1-3.
Agrawal - "Nested parallelism in transactional memory"—Published 2008; pp. 163-174.
Bobba—"Performance Pathologies in Hardware Transactional Memory"—Published 2007; pp. 1-11.
Author Unknown—"Hw-breakpoint: shared debugging registers"—Published Sep. 16, 2009; pp. 1-3.
Scherer—"Contention Management in Dynamic Software Transactional Memory"—Published Apr. 2004; pp. 1-10.
Curnow—"An Embedded Processor Architecture with Extensive Support for SoC Debug"—Retrieved Jun. 11, 2010; pp. 1-5.
Harris et al., "Abstract Nested Transactions", Aug. 2007 CiteSeerX, http://citeseer.ist.psu.edu/viewdoc/summary?doi=10.1.1.126.3885, pp. 1-10.
U.S. Appl. No. 12/495,582, Oct. 4, 2011, Office Action.
U.S. Appl. No. 12/493,163, Nov. 28, 2011, Notice of Allowance.
U.S. Appl. No. 12/493,165, Dec. 12, 2011, Office Action.
U.S. Appl. No. 12/493,167, Jan. 20, 2012, Office Action.
U.S. Appl. No. 12/493,164, Feb. 3, 2012, Office Action.
U.S. Appl. No. 12/493,161, Feb. 21, 2012, Notice of Allowance.
U.S. Appl. No. 12/495,582, Mar. 14, 2012, Notice of Allowance.
U.S. Appl. No. 12/493,162, Mar. 16, 2012, Office Action.
U.S. Appl. No. 12/493,168, Mar. 29, 2012, Office Action.
U.S. Appl. No. 12/493,161, Apr. 9, 2012, Notice of Allowance.
U.S. Appl. No. 12/638,929, Apr. 4, 2012, Office Action.
U.S. Appl. No. 12/638,929, Aug. 20, 2012, Office Action.
U.S. Appl. No. 12/493,164, Aug. 16, 2012, Office Action.
U.S. Appl. No. 12/493,168, Sep. 17, 2012, Notice of Allowance.
U.S. Appl. No. 12/493,165, Sep. 24, 2012, Notice of Allowance.
U.S. Appl. No. 12/493,167, Oct. 5, 2012, Office Action.
U.S. Appl. No. 12/493,162, Oct. 24, 2012, Office Action.
U.S. Appl. No. 12/638,929, Nov. 29, 2012, Notice of Allowance.
U.S. Appl. No. 12/638,103, Dec. 7, 2012, Office Action.
U.S. Appl. No. 12/638,214, Jan. 4, 2013, Office Action.
U.S. Appl. No. 12/493,167, Mar. 20, 2013, Notice of Allowance.
Office Action dated Nov. 6, 2014 cited in U.S. Appl. No. 12/638,345.
Notice of Allowance dated Mar. 25, 2015 cited in U.S. Appl. No. 12/638,345.
Office Action dated Jan. 27, 2015 cited in U.S. Appl. No. 12/493,162.
Office Action dated Apr. 21, 2016 cited in U.S. Appl. No. 14/328,119.
Office Action dated Apr. 28, 2016 cited in U.S. Appl. No. 12/493,162.
Office Action dated Nov. 30, 2015 cited in U.S. Appl. No. 12/493,162.
Office Action dated Dec. 2, 2015 cited in U.S. Appl. No. 14/328,119.

\* cited by examiner

EFFICIENT GARBAGE COLLECTION AND EXCEPTION HANDLING IN A HARDWARE ACCELERATED TRANSACTIONAL MEMORY SYSTEM

CROSS-REFERENCE TO RELATED APPLICATIONS

This application is a continuation of prior application Ser. No. 12/638,929 filed Dec. 15, 2009, titled "EFFICIENT GARBAGE COLLECTION AND EXCEPTION HANDLING IN A HARDWARE ACCELERATED TRANSACTIONAL MEMORY SYSTEM", which is incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

Often computing system implement transactional operations where for a given set of operations, either all of the operations should be performed or none of the operations are performed. The set of operations that should all be performed or not performed may sometimes be referred to as an atomic block of operations. For example, a banking system may have operations for crediting and debiting accounts. When operations are performed to exchange money from one account to another, serious problems can occur if the system is allowed to credit one account without debiting another account. However, transactional computing maintains historical information such that operations can be rolled back if all operations in an atomic set of operations cannot be performed. If all of the operations in the atomic set of operations have been performed, then any changes to data stored in memory are committed and become globally available to other actors for reading or for further operations. Transactional computing can be implemented, in some systems, using specialized hardware that supports transactional memory. In systems where hardware does not support hardware assisted transaction computing, transactional computing can be performed by using software techniques.

Challenges may arise at the intersection of hardware acceleration of transactional memory and automatic memory management via garbage collection (GC). GC involves the traversal of memory to find objects that are no longer in use to reclaim memory space. Typically GC works by finding live objects and deducing that the rest of memory contains dead objects. This may be particularly manifest on virtual machines such managed code .NET® languages running on the Microsoft Common Language Runtime, or through Java running on a Java Virtual Machine.

Assuming use of a hardware accelerated unbounded transaction management system that works well for explicit (manual) memory management, the introduction of automatic memory management introduces some problems. In particular, inadvertent (and programmer-unavoidable) contention and the ensuing transaction reexecutions will arise when multiple threads' accesses to managed objects in turn access internal memory manager data structures. For example, automatic memory management may use card marking tables for garbage collection. In particular, garbage collectors typically traverse memory for objects that are still in use. Scanning the entire memory heap for live objects may be particularly resource intensive, so generation scans may be performed where scanning of more recently created objects is performed more often than scanning of older objects. When a reference to a new object is stored into an old object, a card marking table may be used to indicate that the old object should be scanned. However, the card marking table may be shared such that multiple agents use the same memory for card marking table purposes. In addition to that, a card table typically uses a compact representation, for example, a single Boolean field in the table may represent the existence of old-to-new pointers in a large region of memory. Thus, a write to the card marking table may cause a hardware transaction to abort, due to contention. Other implementations of "remembered sets" of intergenerational object references may suffer from similar issues.

Another issue that may arise is that compacting garbage collectors may quietly move objects to new addresses during a collection. Thus, while fine for automatic garbage collection, this movement presents problems in hardware assisted transactional memory systems, since a thread could be monitoring, using a hardware transaction, changes to an object at its old location, while the GC moves the object to a new location, unbeknownst to the hardware transaction, since the GC doesn't change any of the object's contents at the old location.

Additional issues may arise with hardware transaction systems due to 1) the sojourn through the OS when the exception is raised, 2) successfully catching and handling the exception without aborting the transaction, and 3) in the event the exception is uncaught and leaves the atomic block, with validating the transaction and then correctly marshalling the exception object, which is potentially only present only in buffered cache lines, out of the transaction, before aborting the transaction and invalidating the buffered lines.

Note that when an exception is raised, it is possible to abort the cache resident transaction, flush hardware buffered state, and reexecute the transaction in a simple STM mode, to rerun to the point of the exception, but this wastes the time and energy already invested in advancing the computation to the exception site. Furthermore, in some cases, by having a transaction transition to software transactional memory, can cause all the extant cache resident implicit transaction managed transactions in the system to abort and reexecute in a slower and more expensive mode.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment includes a method practiced in a computing environment including a hardware assisted transaction system. The method includes acts for handling exceptions while in a hardware assisted transaction. The method includes beginning a hardware assisted transaction, raising an exception while in the hardware assisted transaction, including creating an exception object, determining that the transaction should be rolled back, and as a result of determining that the transaction should be rolled back, marshaling the exception object out of the hardware assisted transaction.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1A:
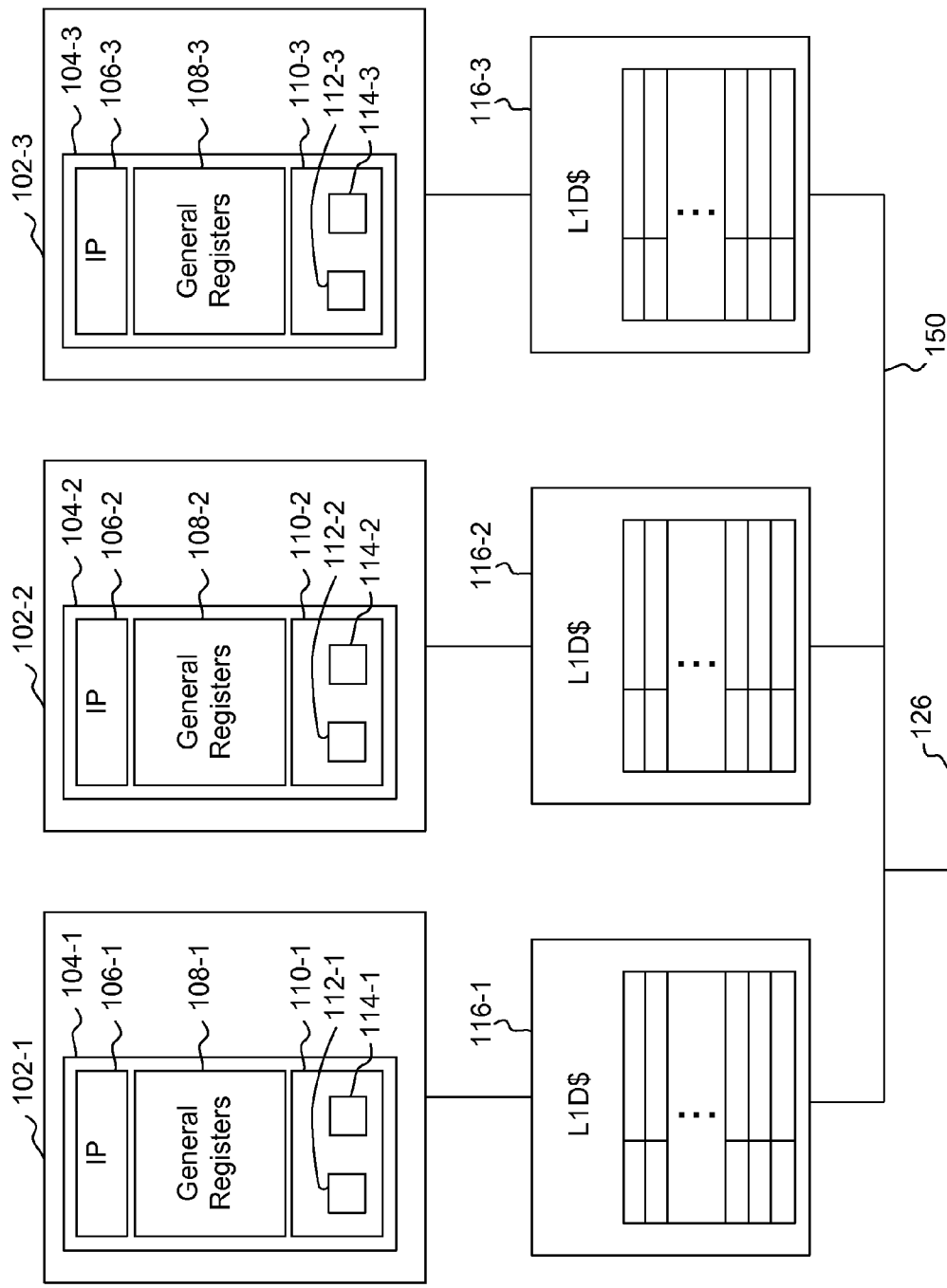
FIG. 1A illustrates a cache hierarchy.

The following presentation is organized into a broad description of the invention and surrounding context, followed by detailed examples of some embodiments that may be implemented.

Fast Flexible Unbounded Transactional Memory (UTM)

Many modern computer systems comprise multiple processors, caches, and a memory system hierarchy that provides a shared memory to multiple threads running on the processors. Threads may concurrently access shared data structures in the shared memory.

It can be difficult to program such machines. Shared data may be accessed at any moment by other threads. It can be difficult to keep other threads from visiting a data structure while it is being modified, to guarantee data structure invariants across threads, etc. For example, consider a job scheduler that tracks the number of running jobs and finished jobs with counter variables. The sum of these counters should always equal the total number of jobs. The following C code illustrates a typical computation:

void end_job( ) { --running; ++ finished; }

If the function end_job( ) is run on one thread while another thread reads the variables 'running' and 'finished', it is possible for the second thread to read inconsistent data, for example, reading the new value of running but the old value of finished.

Transactional memory ("TM") may provide a better programming model for multithreaded shared memory applications. Transactional memory promises to provide code with isolation from other threads' accesses, serialization, as if only one transaction runs to completion at a time, and atomicity, so that either all of the data written within a transaction take effect, or none do so.

An atomic block construct may be added to programming models or languages to provide TM semantics. This control structure delineates (defines the scope of) the statements in a transactional memory transaction. For example:

void atomic_end_job( ) { atomic { end_job( ); } }

In this example, atomic_end_job( ) begins a transaction, calls end_job( ) which accesses the counter variables, and then tries to commit the transaction. The function end_job( ) is run within a transaction; the programmer depends upon the TM system to ensure the counter updates are isolated, atomic, and serialize with respect to any accesses from other threads. The example also illustrates that code such as end_job( ) may be executed in absence of transactions or while within a transaction.

TM may be implemented in various ways. One approach, called bounded hardware TM ("HTM"), seeks to extend and repurpose the cache coherence machinery in a shared memory multiprocessor to provide two key mechanisms needed for correct implementation of TM semantics: conflict detection and version management.

Conflict detection discovers that data read in a transaction in one thread is concurrently written by another agent; or that data written in a transaction is concurrently read or written by another agent. Conflict detection makes transaction isolation and serializability possible. If throughout the lifetime of a transaction there are no data conflicts with any data read or written in the transaction, the transaction will serialize with respect to other agents' memory accesses and transactions.

Version management is used to buffer speculative writes to data in a transaction, until the transaction commits all such writes so they become permanent and globally observed by other agents. In the event of a data conflict, a transaction aborts, by rolling back any speculative writes it performed, and optionally starting over to reexecute the body of the atomic block.

The cache coherence system in a shared memory multiprocessor is a starting point in building a hardware transactional memory system. A plurality of processors with a plurality of caches, possibly private, are coordinated so as to provide software with the illusion of a single, fast shared memory. Sometimes data is found in system memory, and sometimes the latest version is found in one or more data cache lines. When an agent writes its cache's copy of the data, that data is the newest version of the data. If another agent attempts to read the same data, it sources it from the first agent's copy, rather than the stale copy in some other cache or in system memory. This is accomplished by means of a cache coherence protocol such as MESI. MESI (modified, exclusive, shared, invalid) is named for the cache line sharing state and state machine associated with each cache line in each coherent cache in the system. A cache coherence protocol may require agents to observe ("snoop") external reads and writes by the other agents in the system. As one agent reads data or writes data, a request is sent that is snooped by other agents' caches. This may cause a copy of the data cached in one cache to be invalidated, updated, or shared with other caches or with system memory.

These per-line coherence state machine transitions also correspond to the kinds of data conflicts that an HTM needs to detect. If a thread's cache line contains data read in a transaction, and then another agent writes it, the thread's cache's state may be changed. A similar process holds for a transactional write. Some embodiments provide indicators "read monitor" ("RM") and "write monitor" ("WM"), as will be illustrated in further detail in FIGS. 1A and 1B below, at 128 and 130 respectively, and associated behaviors to each cache line entry, to identify which lines are transactionally read and/or written within a transaction, it is possible for cache hardware to detect conflicting accesses to the transaction's sets of read data and written data.

Figure 1B:
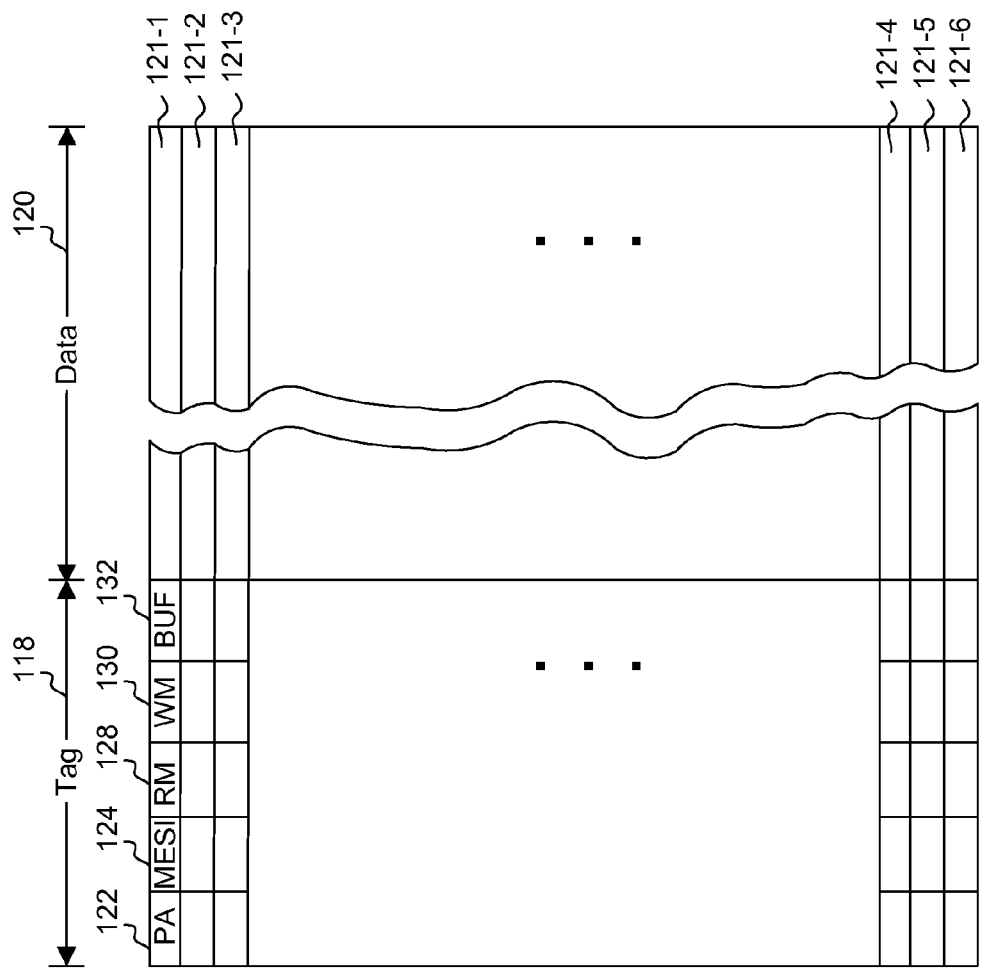
FIG. 1B illustrates details of a data cache with monitoring enabled.
Figure 1B:
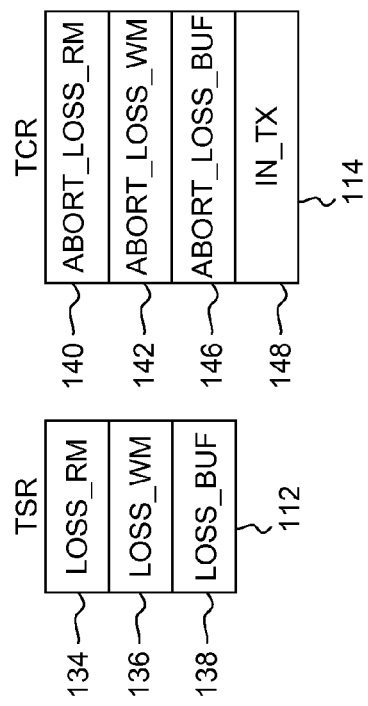

A cache also provides a basis upon which to implement data version management. If a cache is private to an agent, then during a transaction its cache lines may be repurposed to buffer speculatively written data from within the transaction. In some embodiments cache line entries may also comprise a "buffering indicator" ("BUF"), as illustrated in FIG. 1B below at 132, to identify transactionally written lines. Buffered cache data lines are temporarily exempt from cache coherence processing. If another agent requests the latest version of a cache line, the cache does not forward its buffered line because the transaction has not committed and its writes should not be observed by other agents. HTM transaction commit clears buffering indicators across all cache lines such that these lines are again globally observed. HTM transaction abort invalidates any cache lines marked with buffering indicators so any speculatively written data on those lines is discarded.

In some embodiments new instructions enable software to begin, commit, abort, suspend, and handle aborts for HTM transactions. A transaction begin (e.g. "TB") instruction puts the thread in "HTM mode" wherein all subsequent memory accesses are implicitly transactional, setting RM on memory loads and setting WM and BUF on memory stores; a transaction exit and commit (e.g. "TXCOM") instruction tries to commit the transaction, atomically clearing RM, WM, and BUF on cache lines; and so forth. For example, the following illustrates assembly code using the new instructions included in the extended instruction set architecture ("ISA") approximately corresponding to the atomic_end_job( ) function:

TB ; begin transaction
DECR running ; --running;' implicitly transactional R+W
INCR finished ; ++finished; implicitly transactional R+W
TXCOM ; try to exit and commit the transaction This implementation of TM may be designated a cache resident, implicitly transactional TM ("CRITM").

When a transaction's set of memory accesses do not fit in the cache, the cache necessarily evicts a monitored or buffered cache line. In some embodiments this may cause the transaction to abort. Retrying the transaction may not help. In an n-way set associative cache based implementation, a transaction may abort after as few as n+1 memory accesses. Therefore an HTM in itself may not serve as the sole basis of a general purpose transactional memory system.

Nevertheless, some embodiments may elect to run small, simple transactions in an HTM mode and fall back to a more general mechanism when necessary.

Some embodiments may expose to software the RM, WM, and BUF properties that are logically associated with each cache line sized block of memory in the system, and physically associated with the set of cached lines in the cache at a given time. Making these properties visible to the instruction set architecture allows software to explicitly set these properties on an address to monitor it against conflicting accesses by other agents, to explicitly buffer selected data, to test these properties on an address, and to observe any loss of these properties. In some embodiments each thread has its own private copy of these properties.

TM may also be implemented entirely in software ("STM"). For a given memory load or store in the program in the scope of execution of a transaction, an STM system employs an STM read or write bather that wraps the load or store with code to perform conflict detection and version management. In some embodiments, an STM associates some STM state with each data item or chunk of data. In some embodiments, the state is a word of memory stored alongside or otherwise correlated to the data—for example, a "TMW"—a TM metadata word—that at different times may hold a lock for the data, or a version number of timestamp for the data. Different transactions across threads may inspect data's TMWs to perform conflict detection, e.g. to determine if the data is locked by another transaction, or if the data has been written by another transaction since it was read by this transaction. In some embodiments an STM write barrier may attempt to lock the data (via its TMW) against access by other threads and log its original value in case the write may need to be rolled back, and an STM read bather may check the data's TMW to determine whether the data is locked, and note the data's version or timestamp, in addition to performing a store or load respectively. STM barrier bookkeeping overheads can impact the performance of software executed in an STM implementation.

In some embodiments transactional memory programming constructs such as atomic blocks fully compose with other constructs such as loops. It has been observed that if a data access occurs within a loop in a transaction, the data access' TM bather may be performed for the same data over and over again at considerable overhead. In some embodiments it suffices to take a TM read or write barrier once per transaction per data item. Therefore a significant performance optimization may be to apply a "barrier filter" to a TM barrier code sequence, which employs a filter indicator state per address per transaction, and first tests this indicator to determine whether the barrier has already been performed for this data address in this transaction; if so, the rest of the barrier is skipped; if not, the rest of the barrier is performed and the indicator is set to record the read or write barrier has been performed for this data item for this transaction.

It is expensive for a software implementation to maintain and consult this filter indicator for each data item accessed in a transaction. Therefore it may be beneficial to provide hardware assistance to associate per-transaction per-address state for each data item that may be accessed. In some embodiments the RM, WM, and BUF indicators described above, in addition to their roles in conflict detection monitoring and write buffering, may also be used as filter indicators, where the processor instruction set includes instructions to explicitly set, reset, and test the state of these respective indicators. For example in some embodiments the instructions to test RM, WM, and BUF properties for an address might be designated TESTRM, TESTWM, and TESTBUF. In some embodiments such test instructions might set a processor condition code or similar branch predication indicator if a property is set for the address. In some embodiments the processor condition code is already present in a legacy ISA from which an extended ISA is derived. One such processor condition code is the carry flag CF implemented in many ISAs.

Therefore, a hardware accelerated STM ("HASTM") may be implemented such that on processors with this transactional memory hardware support, the RM, WM, and BUF indicators may be used by HASTM read and write barriers to perform redundant barrier filtering by testing the presence of a indicator for an accessed data item. If set, the barrier has already been performed for the item and the rest of the barrier code can be skipped; if not set, it may be the barrier has not yet been performed, or it may be the indicator was lost when the cache line holding the indicator was evicted or invalidated. If not set, the rest of the barrier including the STM conflict detection and version management bookkeeping are performed as before and the indicator is set for the data item.

To further increase the performance of the TM system, in some embodiments it may be possible to run each threads' transactions (if any) in transaction execution modes specific to the size, duration, and complexity of each respective transaction. If a transaction is small and simple, it may successfully execute and commit using CRITM execution mode. If a transaction is large, long running, or complex, it may require execution in an STM or HASTM execution mode. If a transaction is run on an older legacy processor that lacks TM hardware extensions, it may have to run in STM mode. Other threads sharing the same shared memory may be running code non-transactionally (in the 'non-transactional' TM mode). So multiple threads may simultaneously run various transactions in various transaction execution modes.

This approach may offer the best of both worlds: the efficiency of hardware TM execution when possible and the generality of software TM otherwise. However a TM system should operate correctly even when there are potential or actual data access conflicts across threads running in different modes. So STM threads' conflict detection and version management data structures and algorithms can be made compatible with HTM threads' cache based approaches.

In some embodiments this may be accomplished by a "cache resident implicitly-transactional STM-compatible TM" ("CRISTM") TM execution mode. Like CRITM, CRISTM performs conflict detection and data versioning in hardware, implicitly as data items are accessed, and also CRISTM employs read and write barriers that first test the data's STM lock state (e.g. in its TMW) if any to ensure it is not locked by another STM thread. This implicitly sets a read monitor on the data's lock. In this way, CRISTM-mode threads respect STM locks, and subsequent STM data writes on other threads may be observed (for example, via loss of read monitoring) by CRISTM based threads. Similarly, CRISTM write barriers obey the particular STM's data, lock, versioning, and/or timestamp discipline particular to a given STM algorithm. For example, if after an STM transaction, a data item's TMW is updated with a new version so that other S™ transactions may detect a read-write data conflict, then in the same way, a CRISTM write barrier will (in addition to writing the data) write an updated version in the data item's TMW. Because CRISTM writes are buffered, this TMW write is write buffered and only becomes globally observed when and if its CRISTM transaction commits In some embodiments such approaches allow multiple threads to concurrently execute multiple transactions using multiple transactional execution modes, correctly and efficiently. A transaction may start in a hardware accelerated mode like CRISTM and on abort, roll back the transaction and reexecute it using a software based TM implementation, and do so without disturbing execution of code including TM code that may be executing on other threads.

Implicit and Explicit Hardware Transactional Memory Semantics

A cache based HTM as described above provides an efficient implementation of TM for transactions that fit in the limited capacity of the thread's private view of its cache.

It may be desirable to reduce the set of data accesses that receive hardware transactional memory semantics such as data conflict monitoring and speculative write buffering. In particular, when executing a transaction, some data accesses, such as to data shared with other threads, may require TM semantics, whereas other data accesses, such as to thread private variables on the stack, may not. If there were a way for software to differentiate the two cases to hardware, it may be possible to run a larger transaction in a given cache by selectively providing TM semantics to just the subset of the data accesses that require it.

In some embodiments such as the HTM described above, an instruction or other ISA mechanism is performed to establish an ambient HTM transaction execution mode on the thread such that data accesses are implicitly and automatically given TM semantics.

In some embodiments, an instruction or other ISA mechanism may be performed to selectively perform a data access that does not receive TM semantics within an HTM transaction execution mode.

In some embodiments, an instruction or other ISA mechanism may be performed to perform a data access that receives TM semantics even if the thread is not in an HTM execution mode.

In some embodiments, such as the Intel x86 and Intel64 architecture, most instructions may have memory operands that implicitly perform read and/or write memory accesses. In some embodiments a possibly optional instruction prefix may designate the memory accesses of the instruction to be explicitly transactional, explicitly not-transactional, or to explicitly receive the current thread ambient transactional semantics, or to explicitly receive the opposite of the current thread ambient transactional semantics, or otherwise modify the default transactional semantics the instruction would otherwise receive.

In some embodiments such as the Intel x86 and Intel64 architecture, memory operands on instructions refer to a default segment selector such as DS: or CS: or SS:, and instructions may also encode alternate selectors. In some embodiments of an HTM, the segment selector may be repurposed to also selectively control whether the data access specified by the instruction's memory operand should receive or not receive transactional semantics. In some embodiments, the specific transactional semantics associating behavior of each selector or sets of selectors in this configuration may be accomplished by setting a selector transaction indication mode control field in a special register in the thread context. In some embodiments various settings of this mode control field may make some or all segment selectors designate explicitly transactional, explicitly non-transactional, thread-ambient, or explicitly contra-thread-ambient transactional semantics for their data accesses.

Some embodiments may eschew implicitly transactional access modes and memory accesses, and instead implement an STM-compatible cache resident hardware TM that uses explicitly transactional memory access instructions. Such a transactional execution mode might be designated "cache resident, explicitly-transactional, STM-compatible TM" ("CRESTM"). Like CRISTM, CRESTM performs conflict detection and data versioning in hardware, for example via read and write monitors and write buffering. Like CRISTM, CRESTM uses STM compatible read and write barriers that in some embodiments 1) load and test the data's STM lock state (e.g. in a TMW) (e.g. via a load-and-explicitly-set-read-monitor instruction where one example may be referred to herein as "MOVXM") to check it is not already locked by another S™ thread; and 2) store (e.g. via a store-andexplicitly-set-buffering instruction where one example may be referred to herein as "MOVXB") a new version (or timestamp, etc.) to the data's TMW. These barriers explicitly set a read monitor on the data's TMW and a write monitor and buffering on the data's TMW so that a subsequent conflicting access to transaction data by a thread running an STM execution mode can be observed by a CRISTM or CRESTM mode thread as a loss of read monitoring, write monitoring, or buffering.

Detailed Examples of Some Embodiments That May Be Implemented

Hardware transactional memory solutions may be implemented using cache memory. Referring now to FIG. 1A, an example environment is illustrated. FIG. 1A illustrates a plurality of processors 102-1-102-3. When referred to generically herein, the processors may be referred to simply as processor 102. In fact any component referred to using a specific appendix designator may be referred to generically without the appendix designator, but with a general designator to which all specific examples belong. Each of the processors implements one or more threads (referred to generically as 104). In the present example, each of the processors 102-1-102-3 supports a single thread 104-1-104-3 respectively. However, embodiments may be implemented where processors support multiple threads. Each of the threads 104-1-104-3 includes an instruction pointer 106-1-106-3, general registers 108-1-108-3, and special registers 110-1-110-3. Each of the special registers 110-1-110-3 includes a transaction control register (TCR) 112-1-112-3 and a transaction status register (TSR) 114-1-114-3. The functionality of these registers will be explained in more detail below in conjunction with the description of FIG. 1B.

Reference once again to FIG. 1A further illustrates that connected to each processor is a level 1 data cache (L1D$) 116-1, 116-2 and 116-3. Details of a L1D$ are now illustrated with reference to FIG. 1B. FIG. 1B illustrates that a L1D$ 116 includes a tag column 118 and a data column 120. The tag column 118 typically includes an address column 122 and a MESI column 124. The MESI indicator is used for implementing the Illinois MESI protocol and indicates a state of data in a cache line. MESI stands for the modified (or dirty), exclusive, shared and invalid states respectively. Because in a cache hierarchy there may be several different copies of a particular piece of data, an indicator is used to indicate the state and sharing of data at a particular location. If the indicator indicates that the data is modified, that means that the data at that location was modified by an agent at that location and no other agents have a cached copy of the data. If the indicator indicates that data is exclusive, this means that no other agents have a cached copy of the data. If the indicator indicates that the data is shared, this means that other agents may share the same version of the data. If the data is indicated as invalid, then the data at the current location is invalid and will not be used.

In a cache-coherent multiprocessor, a level of data cache that is logically private to one processor (usually level one data cache (L1D$)) may be extended with additional MESI states and behavior to provide cache coherence based detection of conflicting data accesses from other agents, and to locally buffer speculative writes in a private cache such that other agents in the system do not observe speculatively written data until the data's state transitions from speculatively written to globally observed.

The address column 122 includes a physical address for data stored in the data column 120. In particular, as illustrated in FIG. 1A, a computing system generally includes system memory 126. The system memory may be, for example semiconductor based memory, one or more hard-drives and/or flash drives. The system memory 126 has virtual and physical addresses where data is stored. In particular, a physical address identifies some memory location in physical memory, such as system DRAM, whereas a virtual address identifies an absolute address for data. Data may be stored on a hard disk at a virtual address, but will be assigned a physical address when moved into system DRAM.

In the present example, the tag column 118 includes three additional columns, namely a read monitor column (RM) 128, a write monitor column (WM) 130 and a buffer indicator column (BUF) 132. Entries in these columns are typically binary indicators. In particular, a RM entry in the RM column 128 is set on a cache line basis for a particular thread, and indicates whether or not a block of data in the data column 120 should be monitored to determine if the data in the data column 120 is written to by another thread. A WM entry in the WM column 120 is set on a cache line basis for a particular thread, and indicates whether or not the block of data in the data column 120 should be monitored to determine if the data in the data column is read by or written to by another thread. A BUF entry in the BUF column is set on a cache line basis for a particular thread 132, and indicates whether or not data in an entry of the data column 120 is buffered data or if the data is cached data. In particular, the BUF entry can indicate whether a block of data is taken out of cache coherence or not.

Notably, while the RM column 128, the WM column 130, and BUF column 132 are treated as separate columns, it should be appreciated that these indicators could be in fact combined into a single indicator. For example, rather than using one bit for each of the columns, two bits could be used to represent certain combinations of these indicators collectively. In another example, RM column 128, the WM column 130, and BUF column 132 may be represented together with the MESI indicators in the MESI column 124. These seven binary indicators (i.e. M, E, S, I, RM, WM, and BUF) could be represented with fewer bits.

Notably, the indicators in the RM column 128, the WM column 130, and BUF column 132 may be accessible to a programmer using various programming instructions made accessible in a processor's instruction set architecture.

FIG. 1B further illustrates details of the transaction status register 112 included in the hardware threads 104. The transaction status register 112 accumulates events related to the read monitor indicator, the write-monitor indicator, and the buffer monitor indicator. In particular, the transaction status register 112 includes an entry 134 to accumulate a loss of read monitor, an entry 136 to accumulate a loss of write monitor, and an entry 138 to accumulate a loss of buffering.

Illustrating now an example, a software designer may code instructions that when executed by the thread 104-1 cause a read monitor indicator to be set for a memory block. If another thread writes to an address in the monitored memory block, such a conflicting access causes the read monitor indicator to be reset, and accumulates in the loss of read monitor entry 134. A similar case applies when a write monitor indicator is set, and another thread reads or writes to an address in the monitored memory block, causing the write monitor to be reset, and accumulates in the loss of write monitor entry 136.

FIG. 1B illustrates further details of the transaction control register 114. The transaction control register 114 includes entries defining actions that should occur on the loss of read monitor, write-monitor, and/or buffering. In particular, the transaction control register 114 includes an entry 140 that indicates whether or not a transaction should be aborted on the loss of the read monitor, an entry 142 that indicates whether or not a transaction should be aborted on the loss of the write monitor, and an entry 146 that indicates if the transaction should be aborted on the loss of buffering. Abort is implemented by a hardware control transfer (jump) to a software abort handler.

For example, and continuing with the example above where a software designer has coded instructions that when executed by the thread 104-1 cause a read monitor indicator to be set for a memory block, if another thread writes to an address in the memory block, in addition to noting such access in the read monitor entry 134, the read monitor indicator in the read monitor column 128 may be reset.

Embodiments may include the use of specialized hardware instructions to address garbage collection, exception handling and transactional memory correctness and efficiency concerns.

Card Tables

When executing in implicit cache resident CRITM (hardware only implicit mode) or CRISTM (hardware assisted implicitly buffered and monitored software mode) mode, both the managed code and the native code in the managed execution engine (CLR-STM) implicitly monitor/buffer all data accesses. This can lead to false contention and unavoidable transaction rollback and reexecution. For example, in the common language runtime (CLR), a store to an object-reference-typed field of an object in the heap always incurs a card marking GC write barrier code sequence to record establishment of certain inter-generational object references. As noted, GC involves the walking of memory to find objects that are in use to as to reclaim memory space that is no longer in use. Typically, newer generations of memory contain the most objects that are no longer in use. Thus generational garbage collection focuses on newer created objects while de-emphasizing older objects. However, references to newer generational objects can sometimes be store in fields of older generational objects. Thus, mechanisms nonetheless are included to check older objects by marks in the card table to indicate that some regions of older generations may include older generational objects where references to newer generational objects have been stored. This lets the GC scan the compact card table looking for potential young-to-old references, instead of having to scan all live objects in the older generations.

The barrier maps the object pointer to an entry in a "card table", which in some embodiments is represented using a single byte, then does a byte store of 0xFF to that entry, or similarly marks the entry as set. Under CRTM or CRISTM, that store establishes a write monitor and buffering (WM+BUF) on its monitored or buffered blocks of memory (MBLK/BBLK). The current CLR implementation of card marking uses a 1 B card to represent 1 KB of heap. So for MBLK_SIZE=64 B, two threads (one of which is in a cache resident transaction) could suffer a write-write conflict upon any concurrent object reference field stores to the same 64 KB aligned heap region.

To avoid such false sharing contention, in one embodiment such card marking code uses an explicit transaction escape action to perform non-monitored/buffered accesses to such infrastructure data structures. Embodiments may be implemented where the CLR write barrier code sequence uses a specialized instruction where data load and store instructions are explicitly unmonitored and unbuffered to write the card table entry without adding it to the thread's transaction's write set. One example of this instruction may be represented herein as "MOVXU.B" If all such accesses to the card marking tables do not establish read or write monitoring, then these accesses can safely proceed concurrently, commute safely, etc.

This approach is correct even if a transaction's execution causes a card to be marked and then the transaction is subsequently rolled back, because it is benign (from a correctness perspective) to set a card. This merely notes there may be intergenerational object references from this card's memory block. This causes only extra work on the first subsequent GC when a check for objects no longer in use at the pointed to object are made, after which the card bit(s) are cleared if no intergenerational references remain there.

Also note, when used with a handler-based cache resident transaction, such escape actions tolerate being interrupted at any point (the handler is able to restore invariants) and such escape actions either guarantee that any MOVXU will not hit a buffered line, or tolerate skid due to MOVXU.

In an alternative embodiment, such escape actions are implemented by suspending and resuming an implicitly-buffered transaction, which allows execution of the escape action without modifying it to use MOVXU instructions.

Embodiments may refer to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed. Further, it should be understood that the methods may be practiced by a computer system including one or more processors and computer readable media such as computer memory. In particular, the computer memory may store computer executable instructions that when executed by one or more processors cause various functions to be performed, such as the acts recited in the embodiments.

Figure 2:
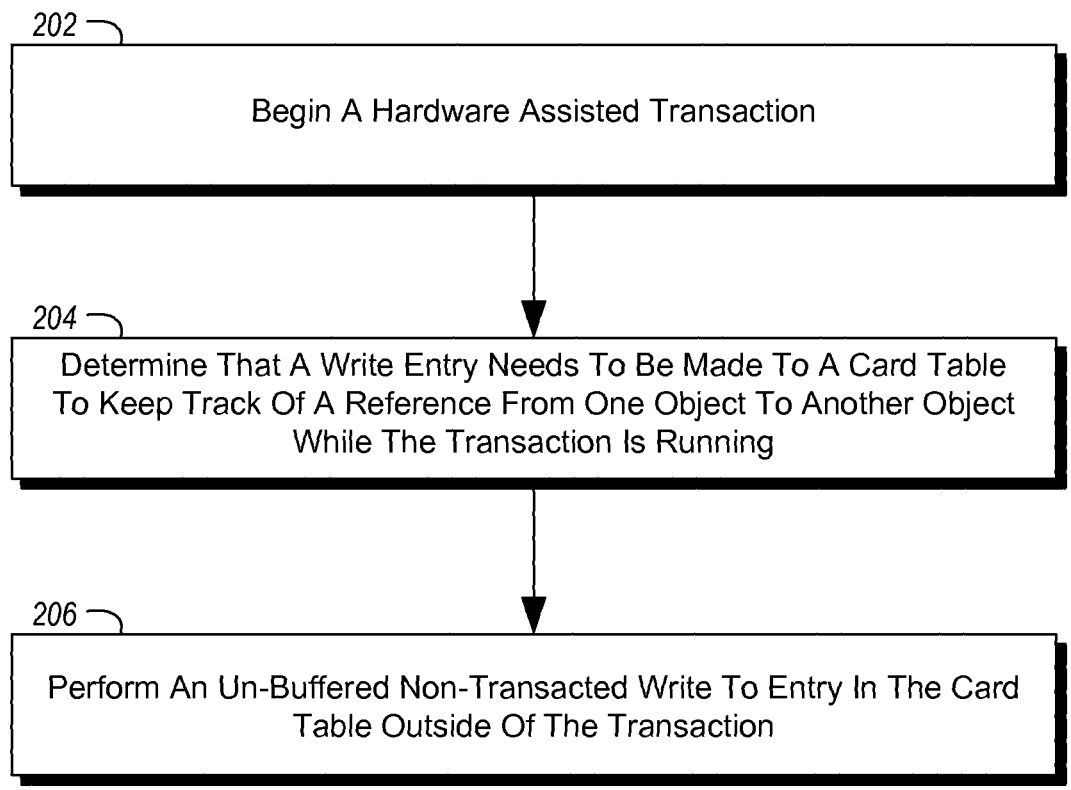
FIG. 2 illustrates a method of writing to a card table.

Referring now to FIG. 2, a method 200 is illustrated. The method 200 may be practiced in a computing environment including a hardware assisted transaction system. The method includes acts for writing to a card table. The method 200 includes beginning a hardware assisted transaction (act 202). For example, as described above, reads and writes can be buffered and monitored to prevent conflicting reads and writes using the isolated cache memory structure described above.

The method 200 may further include determining that a write entry needs to be made to a card table to store a reference from one object to another object while the transaction is running (act 204). For example in a generational garbage collection system, references may be made need to be made in a card table so that newer object created in older generational objects can be discovered. In particular, the method 200 may be practiced where performing an unbuffered non-transacted write to an entry in the card table in outside of the transaction is performed as part of intergenerational garbage collection.

The method 200 further includes performing an unbuffered non-transacted write to an entry in the card table outside of the transaction. For example, writing to the card table outside of the transaction may include executing a specialized instruction that performs an explicitly non-hardware transacted load and/or store. Alternatively, the method 200 may further include suspending the transaction and writing to the card table outside of the transaction may be performed while the transaction is suspended. The method 200 may further include resuming the transaction after writing to the card table.

The method of 200 may further include aborting the hardware assisted transaction and rolling back any buffered writes performed during the transaction without rolling back the un-buffered non-transacted write to the card table. In particular, the write to the card table survives an aborted transaction. Thus, the method 200 may further include performing a garbage collection including checking for objects no longer in use at a location pointed to by the un-buffered non-transacted write to the card table. Clearing the card table entry once no intergenerational references remain as indicated by the card table entry may also be performed.

Heap Segment Allocation

GC modes typically use generational collection, in which most collections concentrate on the youngest generation, evacuating the live objects, leaving the youngest generation mostly empty. Allocation in the young generation is contiguous "bump pointer" allocation: there is a free pointer indicating the boundary between allocated and free space, and allocation determines whether there is enough space for a request, and, if so, increments the free pointer by the size of the allocation request and returns its old value. Inasmuch as the young generation is shared by all threads, this increment is performed using an atomic hardware operation.

However, performing all allocations this way would lead to unacceptable contention on the free pointer. Therefore, each thread allocates a thread-local allocation context, a block of free space of some moderate size, from the shared allocation space, and then allocates objects from this allocation context. In as much as the allocation context is local to its owning thread, no atomic hardware operations are necessary to allocate within it. When an allocation context is exhausted, the thread discards it and allocates a new one. Thus, the allocation contexts that a thread has used may be scattered somewhat randomly in the youngest generation.

In one embodiment, the CLR maintains a large object heap, in which objects larger than approximately 80K are allocated. Objects in the large object heap are not relocated. So consideration should be given to allocation in the large object heap.

The CLR is implemented such that when a GC occurs, the heap is (or can be made to be) walkable, (i.e. filled densely with objects, so that given a pointer to one object, a system can find the start of the next object by adding the current object size to the pointer). Thus, the only unallocated areas of the heaps should be the unallocated portions of in-use allocation contexts (which can be filled in with garbage objects before GC).

Embodiments may be implemented under the assumption that rollback is relatively rare, and thus allow some amount of garbage to be created as a result of an aborted transaction. Some embodiments try to avoid false sharing whenever possible, by preventing different threads from allocating on the same cache line.

Two implementations of small-object allocation are described: one in which all allocations are tentative, another in which all allocations are durable. These correspond somewhat naturally to the implicit and explicit hardware modes. However, special instructions allow durable writes in implicit mode, or tentative writes in explicit mode. Thus, embodiments can selectively choose to do definite allocations in implicit mode, or tentative allocations in explicit mode. Implementations of all four possibilities are described.

Implicit Mode/Tentative Allocation. In implicit mode, writes are by default buffered, and a special action (either temporarily suspending the transaction, or using a specialized load and store instruction illustrated herein as PUMOV) is used to accomplish a durable store, i.e. one that will survive the transaction. A PUMOV store always writes to memory, but, if the target cache line is buffered, it also writes to the buffered version of the cache line. If the line is buffered, the PUMOV is potentially more expensive than a normal store, inasmuch as it may need to write to two cache lines.

Figure 3A:
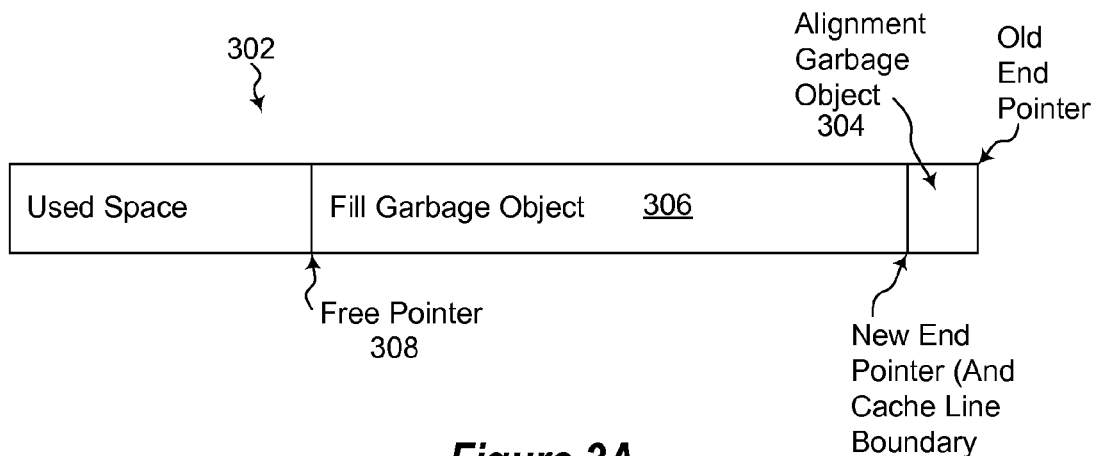
FIG. 3A illustrates heap allocation.

Referring now to FIG. 3A, when a (hardware) transaction starts, the thread executing the transaction will have a current allocation context 302, with some amount of free space. Before starting the hardware transaction, this remaining space will be filled with one or two "garbage objects:" The CLR has a special type for this purpose, distinct from all user allocated types—it is similar to an array in that it has a dynamic size, but does not need to have its elements initialized. First, (if needed) the end of the allocation context is rounded down to a cache-line boundary, and the remainder is filled with a small "alignment garbage object 304." Next, the remaining free space is filled with a (presumably) larger "fill garbage object 306." The free pointer 308 of the allocation context remains unchanged, however, pointing to the start of the fill garbage object 306. The purpose of this fill garbage object 306 will be explained presently. FIG. 3A shows the state of initialize allocation context 302 before the start of the hardware transaction. In this state, the hardware transaction now starts. Allocations within allocation contexts are performed using the normal instruction sequences so that loads and stores are implicitly monitored and buffered (i.e. they are tentative). In particular, the free pointer 308 of the allocation context will be modified transactionally, and allocated space will be initialized transactionally—this initialization includes writes to object header word, method table pointer, array size for arrays, and contents for ref-containing objects and arrays.

At some point the transaction may exhaust this allocation context and allocate a new one. In the CLR, the thread keeps no record of previously-used allocation contexts. This explains the purpose of the garbage objects: if the transaction aborts, the objects that were "allocated over" the "Fill Garbage Object 306 disappear, leaving just the garbage object. This maintains the walkability of the heap.

Figure 3B:
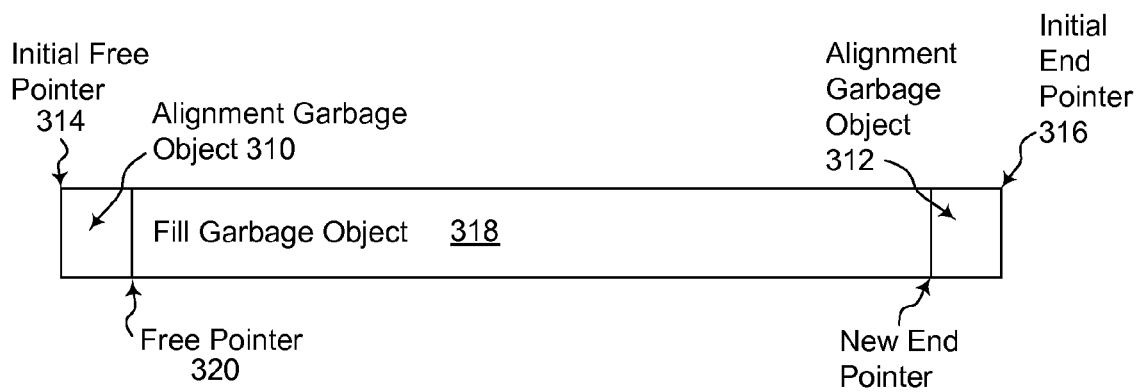
FIG. 3B illustrates heap allocation.

As illustrated in FIG. 3B, to allocate the new allocation context in implicit mode, the transaction is first suspended. Suspending the transaction can be accomplished using various instructions that cause the hardware to enter a non implicitly transactional state or a string of explicitly non-transactional loads and stores can be used. As discussed, the extra expense of exiting the transaction is affordable because allocation contexts are allocated infrequently. The new allocation context is allocated using the normal atomic compare-and-swap. Before resuming the transaction, the newly-allocated context is set up much as above. In this case, however, alignment garbage objects 310 and 312 are allocated at both ends of the allocation context if needed, the initial free 314 and end 316 pointers are adjusted as necessary, and a "Fill Garbage Object" 318 is set up in the middle.

When the transaction commits, all of its modifications, in particular all of the initializations of objects it has allocated, are "reified"—inasmuch as these have overwritten the fill garbage objects, these have essentially disappeared. The final value of the free pointer 320 in the current allocation context is confirmed, and this context is now available for use by subsequent non-transactional code.

The above handles small-object allocation within allocation contexts. The following addresses large-object allocation. Added expense here is acceptable in view of the fact that large object allocation is both rare and expensive (the expense being dominated by the cost of zeroing the large object contents). Therefore, the transaction is suspended to accomplish the allocation.

Implicit Mode/Durable Allocations. In general, it is a good idea in implicit mode to use durable, unbuffered/monitored writes when possible, to reduce cache usage for buffering and monitoring that can lead to capacity-related aborts. Therefore it is useful to consider a variant in which, even in implicit mode, allocations are performed durably. This may interact synergistically with so-called new-object optimizations, where accesses to objects allocated within the current transaction do not need to be transacted, since they are not visible to other threads before the transaction commits. Thus, in a hardware-supported mode, such accesses could be made without monitoring or buffering. In an implicit hardware mode exploiting so-called "naked" code generation, in which the code executed for the transactional and non-transactional version of a method is the same, embodiments may only exploit static new-object optimizations—accesses to objects that embodiments can statically prove are allocated in the current transaction (if the method is executed in a transaction), may use a possibly-durable write or an unmonitored read, via a durable PUMOV instruction. For example, writes in constructors can always use PUMOV. The allocation stores that initialize an object to make it walkable can also use PUMOV. In a more optimal scenario when these encompass all the stores to a cache line, because there is never an additional implicitly buffered store, then embodiments can avoid buffering that cache line. In a less optimal scenario, however, there could be a price, inasmuch as a PUMOV may need to write to both a buffered line and to memory is therefore potentially more expensive than either a regular store or a buffered store.

Explicit Mode/Durable Allocation. In explicit mode, transactional loads and stored are accomplished using explicit special hardware instructions (EML=Explicitly Monitored Load, and ESB=Explicitly Buffered Store). Normal loads and stores are non-transactional—but a non-transactional store to a cache line that the thread has previously monitored or buffered causes the thread to lose monitoring or buffering, which generally means it is doomed. PUMOV will act like a non-transactional store if the target cache line is not buffered, or like an ESB if it is.

In view of the preceding, allocation can be accomplished as follows: All allocations will be definite: they will survive an aborting transaction. Large objects and allocation contexts are allocated normally, that is, non-transactionally. Explicit modes can be run with or without enabling automatic transition to an ejector handler on loss of monitoring or buffering. An ejection handler is a routine which the software instructs the hardware to invoke in case a hardware transaction is aborted, either synchronously by the code executing it, or asynchronously due to loss of monitoring or buffering, or due to overflowing the cache. If an ejector is enabled, embodiments, explicitly disable it while allocating large objects and allocation contexts, so that an asynchronous transfer to an ejector does not leave the heap in an inconsistent state.

Figure 3C:
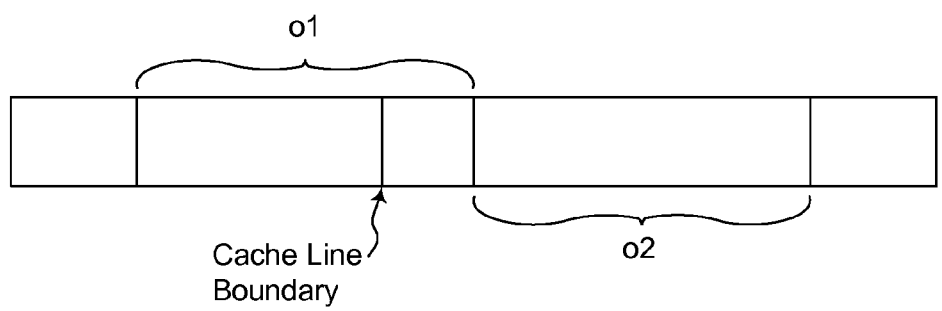
FIG. 3C illustrates heap allocation.

Referring now to FIG. 3C, within an allocation context, object o1 is allocated, which is then manipulated via transactional stores. In particular, embodiments store to the part of the o1 that extends onto the second cache line, causing the entire cache line to be buffered. If embodiments then allocate object o2, and initialize its header and method table with non-transactional stores, buffering will be lost, and the transaction will be doomed. Therefore, embodiments use a PUMOV to do these initializing stores. This PUMOV writes through to memory as well as to a buffered cache line if the target cache line is buffered. Updates to the free pointer of the allocation context are performed non-transactionally.

Generally there is a free choice between zeroing out the contents of an allocation context when it is allocated, or on a per-object basis as they are allocated. The tradeoff is economies of scale for the bulk zeroing, against the possibility that cache lines will be brought in twice, once to zero and once to actually initialize in a constructor. In the definite allocation scheme, if embodiments zero at allocation time they will do so with the more-expensive write-through PUMOV. This may tip this trade-off in favor of zeroing at context allocation time.

If the ejector handler is enabled, object allocations occur too frequently to disable and re-enable. This can be handled, however, by paying careful attention to the order of operations during allocation. Space above the free pointer is considered garbage until the free pointer changes. Therefore, embodiments can initialize the object before incrementing the free pointer. If the transaction aborts before this, embodiments have just modified garbage; if after, the object is definitely allocated.

Explicit Mode/Tentative Allocation. The unused space is initialized in an allocation context with allocation and fill garbage objects using durable writes just as in implicit mode. In explicit mode, embodiments can call a special allocation routine, so embodiments do not have to worry about the same allocation code being used inside and outside a transaction. This special allocation routine could use buffered writes to initialize objects.

In the discussion of tentative allocation, one embodiment filled a region with a garbage object durably, then overwrote it with tentative objects. When new-object allocations were discussed, it was suggested that embodiments might do some writes to objects durably, even in implicit mode. Care should be taken to ensure that these writes do not affect the walkability of the heap in the case where the transaction aborts. To be concrete, assume that a "filler garbage object" looks like an integer array, containing an object header word, a method pointer, and an array size. Now assume that embodiments overwrite that by allocating a non-array object "o" whose first field is "f." The address of "o.f" is the same as that of the array size field of the filler garbage object. If a constructor initializes "o.f" durably, then the heap will not be walkable if the transaction aborts. Embodiments could fix this by not overwriting the filler garbage object, instead starting allocation after the header of this object, and tentatively overwriting the size field with 0. To optimize this, embodiments can write a single garbage object to be both the initial alignment garbage object, and the filler garbage object. The durable write would be the combined size, and embodiments would then tentatively overwrite this to only be the size necessary for alignment, and start allocation after this alignment size (ensuring that this is at least large enough to prevent the garbage object header from being overwritten.)

Another issue that can be taken into account with the "filler alignment/garbage object" plan is that unless embodiments take steps to prevent it, transactions that allocate no objects will gradually eat up allocation space by allocating filler objects. Embodiments might prevent this by keeping track of whether a transaction has allocated any memory. A transaction that commits without allocating memory could explicitly revert (using non-transactional stores after the hardware commit) to a recorded free-pointer value in the current local allocation context.

Garbage Collection Compacting

Certain TM modes rely on hardware read monitoring to continually validate the read set of a transaction—including cache resident TM modes and some explicit HASTM modes. If a transaction on thread 1 reads some objects (or TMWs) and a GC occurs and on thread 2 the objects are copied elsewhere and computation continues, subsequent writes to those objects (at new addresses) will not cause a loss of read monitoring on thread 1, and this now inconsistent transaction may erroneously commit Normally such a situation is averted by the GC suspending thread 1, which induces a transaction abort, but in some cases the GC may not require thread 1 to stop, in which case its transaction may survive ensuing in the above inconsistency, A solution to this hazard is to have every such transaction first establish read monitoring on a common global variable, illustrated herein by example as GCMonitor, via an explicit instruction such as, is illustrated herein as SETRM (set read monitor), and have the memory manager write to GCMonitor each time it does any operation which may change objects' virtual addresses (such as a GC heap compaction). This will cause all hardware assisted transactions to abort so that garbage collection activities can be completed.

Figure 4:
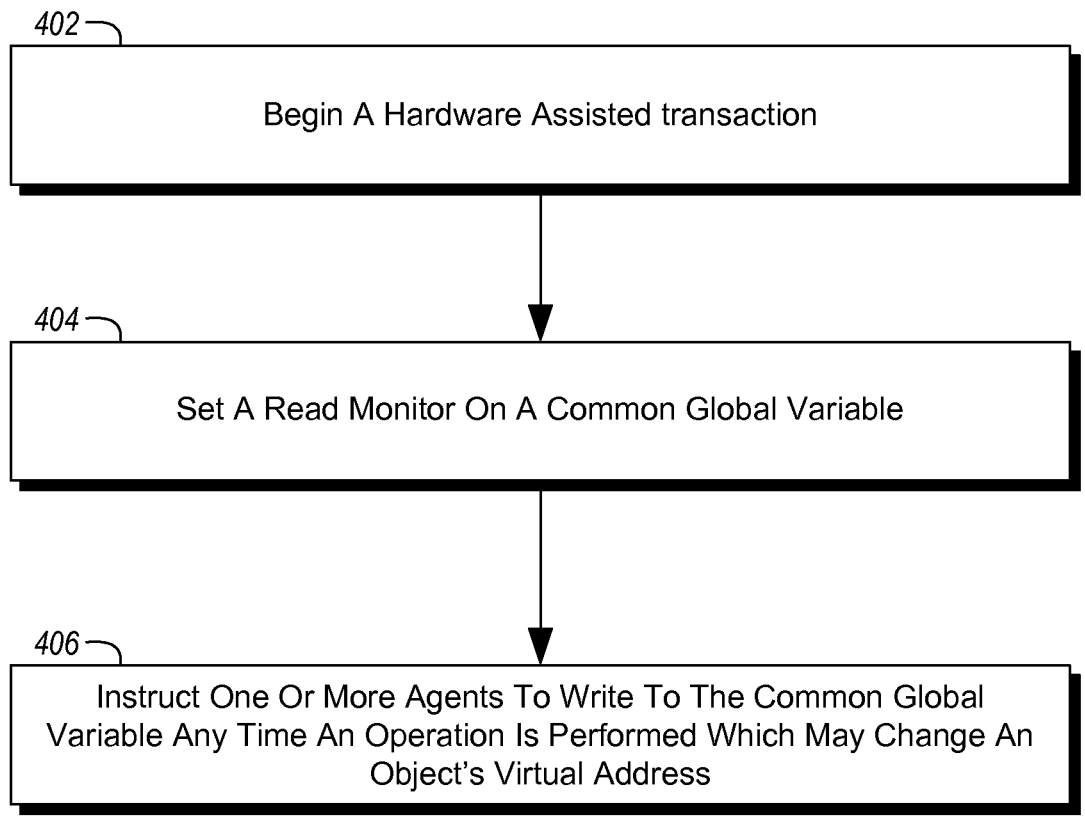
FIG. 4 illustrates a method of handling garbage compaction.

Referring now to FIG. 4, a method 400 is illustrated. The method 400 may be practiced in a computing environment including a hardware assisted transaction system. The method 400 include acts for handling garbage collection compaction occurring when a hardware transaction is active. The method 400 includes beginning a hardware assisted transaction (act 402). As part of the hardware assisted transaction, the method 400 includes setting a read monitor on a common global variable (act 404). In one embodiment, setting a read monitor on a common global variable includes using an explicit set read monitoring instruction included as part of an instruction set architecture for the hardware used in the hardware assisted transaction. The method further includes instructing one or more agents to write to the common global variable any time an operation is performed which may change an object's virtual address (act 406).

The method 400 may further include, an agent writing to the common global variable, causing the hardware assisted transaction to abort. In some embodiments, the agent writing to the common global variable may be a memory manager. The memory manager may write to the common variable as a result of the memory manager performing a memory heap compaction.

Exception Handling

Embodiments may also be configured to implement an overall-high performance unbounded TM system with rich semantics, to go beyond what can be achieved with a bounded hardware TM, including allowing fast cache resident transactions to execute alongside software TM transactions (even those on software threads that are not scheduled to cores).

One of the sub problems is to implement correct and functional managed code exception handling in the two anticipated cache resident modes, CRITM and CRESTM. In particular embodiments are configured to handle 1) the sojourn through the OS when the exception is raised, 2) successfully catch and handle the exception without aborting the transaction, and 3) in the event the exception is uncaught and leaves the atomic block, with validating the transaction and then correctly marshal the transactionally updated state, which is present only in buffered cache lines, out of the transaction, before aborting the transaction and invalidating the buffered lines. In the embodiments illustrated below, marshaling is accomplished by serializing the transactionally updated state out of the transaction before rolling back the transaction, thus preserving the transactionally updated state.

Note that when an exception is raised, it is possible to abort the cache resident transaction, flush hardware buffered state, and reexecute the transaction in a simple STM mode, to rerun to the point of the exception, but this wastes the work already invested in advancing the computation to the exception site. Furthermore, in some cases, by having a transaction transition to STM, can cause all the extant CRITM transactions in the system to abort and reexecute in a slower and more expensive mode such as CRESTM, HASTM, or STM. As such, embodiments may be optimized to dispatch and handle the exception in the original cache resident mode.

A first part of some embodiments includes the ability to have a UTM hardware assisted transaction executing, with certain cache lines monitored and buffered, and sojourn into the kernel on an exception, and resume to user mode SEH (structured exception handling) exception dispatch, without necessarily losing the monitored and buffered lines.

A description of what happens in kernel/user exception dispatch in x86 SEH can be found at http://www.nynaeve-.net/?p=201, which is incorporated herein by reference in its entirety. This description reads as follows: "KiUserExceptionDispatcher is the routine responsible for calling the user mode portion of the SEH dispatcher. When an exception occurs, and it is an exception that would generate an SEH event, the kernel checks to see whether the exception occurred while running user mode code. If so, then the kernel alters the trap frame on the stack, such that when the kernel returns from the interrupt or exception, execution resumes at KiUserExceptionDispatcher instead of the instruction that raised the fault. The kernel also arranges for several parameters (a PCONTEXT and a PEXCEPTION_ RECORD) that describe the state of the machine when the exception occurred to be passed to KiUserExceptionDispatcher upon the return to user mode. (This model of changing the return address for a return from kernel mode to user mode is a common idiom in the Windows kernel for several user mode event notification mechanisms.)"

"Once the kernel mode stack unwinds and control is transferred to KiUserExceptionDispatcher in user mode, the exception is processed locally via a call to RtlDispatchException, which is the core of the user mode exception dispatcher logic. If the exception was successfully dispatched (that is, an exception handler handled it), the final user mode context is realized with a call to RtlRestoreContext, which simply loads the registers in the given context into the processor's architectural execution state."

Returning now to the present embodiments consideration is given to what happens next in CRITM (cache resident, implicit TM) mode and CRESTM (cache resident, explicit, STM-locks-respecting, TM mode).

In either mode, the SEH exception dispatch chain is walked in search of an exception handler that handles the exception. If one handles the exception (EXCEPTION_EX-ECUTE_HANDLER), the stack is unwound (calling unwind handlers) and execution resumes at the handler. If a handler causes the faulted instruction to reexecute (EXCEPTION_ CONTINUE_EXECUTION), then the instruction reexecutes. In either case, in CRITM, if a loss of monitoring or buffering occurs, embodiments can transfer to the transaction's ejection handler, the transaction will be aborted and reexecuted. If (CRESTM) monitoring or buffering is lost, execution continues normally but the transaction becomes doomed.

If every handler does not handle the exception (EXCEPTION_CONTINUE_SEARCH) then embodiments may eventually come to the exception handler for the atomic block. In .NET® STM the semantics of an unhandled exception (whether an "asynchronous" exception or user-thrown object) leaving the Atomic.Do( ) block are 1) abort the transaction while 2) propagating the exception further. Inasmuch as aborting a cache resident transaction ensures all of its buffered updates are discarded, embodiments marshal the transaction state to non-buffered data, then abort the hardware transaction support, then unmarshal it into a new exception object and rethrow that.

The following develops representative code using .NET® code generated from an Atomic.Do block that supports CRITM and CRESTM execution, given the context for the interaction between the block's exception handler for CRESTM transaction abort, and the CRITM ejection handler+setjmp/longjmp for "asynchronous" CRITM transaction abort.

Transaction Boundaries. Attention is now directed to how a lexical atomic block should be translated. Because this is complicated, three translations are presented. The first assumes that that CRESTM and STM are the only execution modes, the second will assume that CRITM is the only execution mode, and the third will attempt to allow for all three possibilities.

If CRESTM and STM are the only execution modes, then the translation is:

```
atomic { S }
→
    curtx = CreateTx(curtx, ConstantSiteId);
    <save live locals to "shadow variables" on stack.>
L:
    curTx.StartHWTx( ); // Begin the current hw tx if embodiments are using
it.
    try {
        // First arg indicates transform style.
        STMTransform(CGSTYLE_TV, S); // transaction virtual transform
style
    } catch (Object ex) {
        <restore locals from shadow variables on stack>
        curtx.HandleEX(ex); // Roll back TX and return, else throw.
        goto L;
    }
```

In the preceding, embodiments start creating the transaction. After that, embodiments start the HW transaction if the current execution mode is using hardware acceleration. The transaction executes. If it rolls back, embodiments reach the catch clause, inasmuch as embodiments are using exception-based rollback. Embodiments may marshal and rethrow an aborting user execution.

If CRITM is the only execution mode, then the translation is:

```
atomic { S }
→
    curtx = CreateTx(curtx, ConstantSiteId);
    <save live locals to "shadow variables" on stack.>
    curtx.SaveSetjmpState( );
    if (curtx.IsRexec( )) {
        <restore locals from shadow variables on stack>
        // Could decide on (re-)execution mode here.
    }
    curTx.StartHWTxQ; // Begin the current hw tx
    try {
        // First arg indicates transform style.
        STMTransform(CGSTYLE_NK, S); // naked transform style
    } catch (Object ex) {
        <restore locals from shadow variables on stack>
        curtx.HandleEx(ex); // Marshal ex; Roll back TX; throw.
        assert(false);
    }
```

The ejector will restore the saved register values, and jump to the saved IP. Note, by the way, that the "naked" (indicated by NK) transformation of S is not precisely equal to S: embodiments will still have to do some explicit things to commit the transaction when control flow leaves S. Inasmuch as embodiments are using longjmp-based roll-back, only user-level exceptions that are being thrown reach the catch clause. HandleEx would deep-clone the exception, abort the hardware transaction, and then re-throw the cloned exception.

```
A combined translation, then, could be something like
atomic { S }
→
    curtx = CreateTx(curtx, ConstantSiteId);
    <save live locals to "shadow variables" on stack.>
    if (curtx.LongjmpRollback( )) {
        curTx.SaveSetj mpState( );
        if (curtx.IsRexec( )) {
            <restore locals from shadow variables on stack>
            // Could decide on (re-)execution mode here.
        }
    }
L: curtx.StartHWTx( ); // Begin the current hw, if HW is being
used.
    try {
        if (curtx.CodeGenStyle( ) == CGSTYLE_NK) {
            // First arg indicates transform style.
            STMTransform(CGSTYLE_NK, S);
        } else {
            STMTransform(CGSTYLE_TV, S);
        }
    } catch (Object ex) {
        <restore locals from shadow variables on stack>
        curtx.HandleEx(ex); // Roll back TX and return, else throw.
        goto L;
    }
```

CRITM_Tx::HandleEx(ex) is called for CRISTM running in implicit cache resident transaction mode (MB_DATA or MB_ALL). CRESTM_Tx::HandleEx(ex) is called for CRESTM running in explicit cache resident mode. In either case, when the thrown user exception will escape the atomic block, embodiments serialize the exception object, abort the transaction, then deserialize a copy of the exception, and rethrow that.

In the .NET® STM there are at least two good ways to do that. 1) the CLR has a built-in native object graph cloner that is used to efficiently marshal/unmarshal objects (including exceptions) that are passed between AppDomains. 2) the .NET® Serialization framework supports for serializing/deserializing objects to MemoryStream or byte[ ].

Either way, as embodiments serialize or clone the exception, embodiments read its current fields using the transactions' view, e.g. read fields from their possibly buffered lines, and embodiments write the serialized byte stream using direct (non-buffered) writes. There is a simple implementation of this. If in CRISTM, embodiments can start an escape action by suppressing implicit mode (TX). Embodiments will still read the buffered lines of the exception object graph, meanwhile any writes performed to allocate and write the MemoryStream are direct (not buffered) and will survive the rollback of the cache resident state, assuming embodiments arrange for no newly allocated serialization objects to share BBLKs with buffered ones. (Alternately embodiments can play it safe by using MOVXU for all such stores.)

```
// Simple sketch; note, called while CRITM transaction still extant and
valid
//
// Marshal object state out of transaction, abort the transaction, and
rethrow.
// Simple return causes reexecution when transaction was inconsistent
//
object CRITM_Tx::HandlerEx(ex) {
    __asm { TX } // suppress implicit mode transactions
    using (MemoryStream s = new MemoryStream( )) {
      BinaryFormatter f = new BinaryFormatter( );
      f.Serialize(s, ex); // reads buffered data, and establish monitoring, but
directly writes data into 's'
      __asm { TXC } // rollback/clear UTM state
      // if embodiments got here, the transaction was valid at the point of
serializing the exception
      s.Position = 0; // rewind
      throw f.Deserialize(s);
      }
}
```

The code is similar for CRESTM, but embodiments explicitly validate the transaction before rethrowing the deserialized exception.

```
// Simple sketch; note, called while CRESTM transaction still extant
//
// Marshal object state out of transaction, abort the transaction, and
rethrow.
// Simple return causes reexecution when transaction was inconsistent
//
object CRESTM_Tx::HandlerEx(ex) {
    // arrange for this code to be in a CRESTM escape action -- that is, do
not
instrument this code
    // with CRESTM read/write barriers and buffered stores
    using (MemoryStream s = new MemoryStream( )) {
      BinaryFormatter f = new BinaryFormatter( );
      f.Serialize(s, ex); // reads buffered data, and establish monitoring, but
directly writes data into 's'
      bool fValid = this.Validate( );
      __asm { TXC } // rollback/clear UTM state
      if (!fValid)
         return; // reexecute the transaction
      s.Position = 0; // rewind
      throw f.Deserialize(s);
      }
}
```

Figure 5:
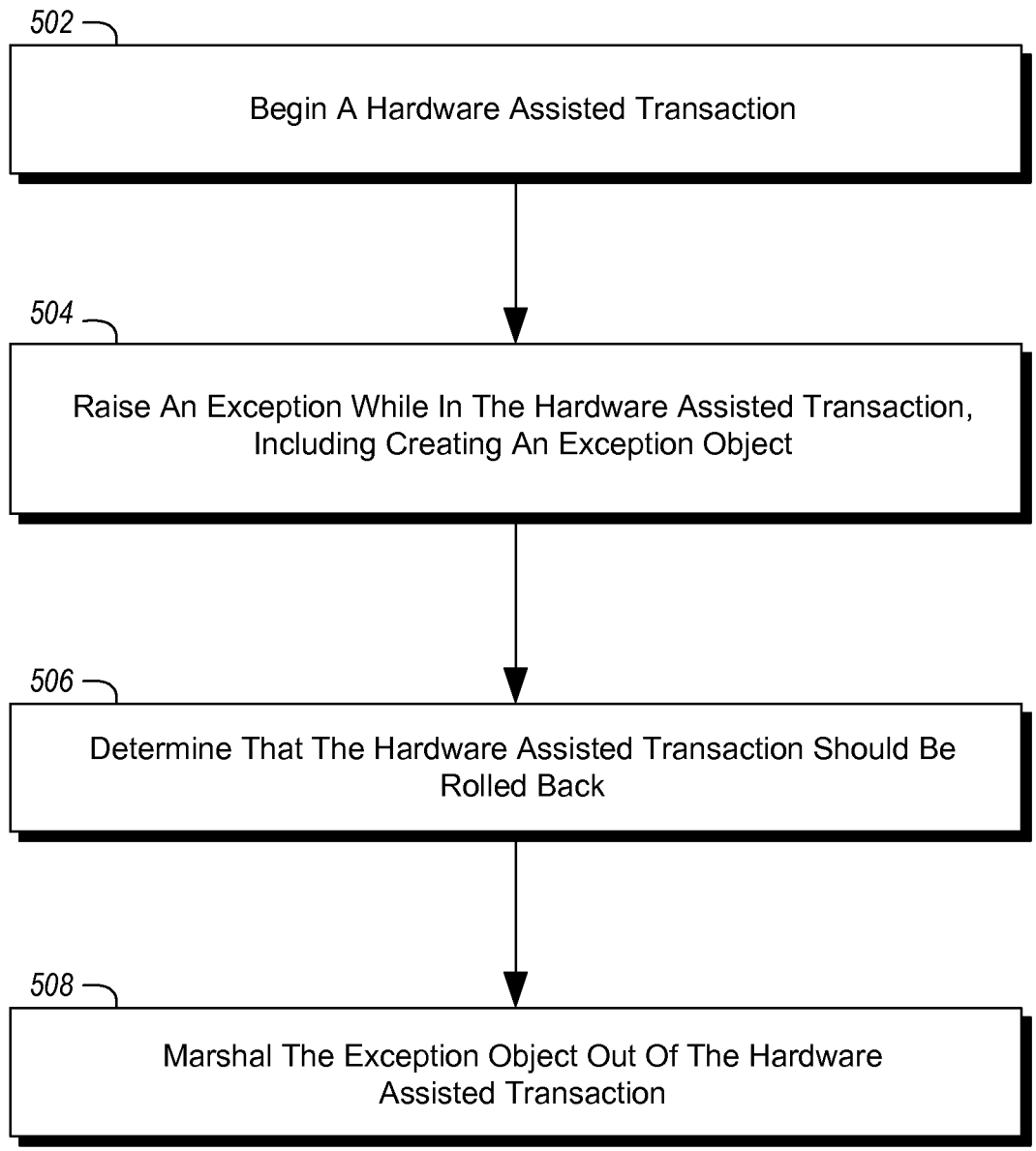
FIG. 5 illustrates a method of handling exceptions.

Referring now to FIG. 5, a method 500 is illustrated. The method 500 may be practiced in a computing environment including a hardware assisted transaction system. The method 500 includes acts for handling exceptions while in a hardware assisted transaction. The method 500 includes beginning a hardware assisted transaction (act 502). The method 500 further includes raising an exception while in the hardware assisted transaction, including creating an exception object (act 504). The method 500 further includes determining that the transaction should be rolled back (act 506). As a result of determining that the transaction should be rolled back, the method 500 includes marshaling the exception object out of the hardware assisted transaction (act 508).

The method 500 may further include rolling back the hardware assisted transaction after the exception object is marshaled out of the hardware assisted transaction. This embodiment may further include determining that the hardware assisted transaction was valid after rolling back the hardware assisted transaction, and as a result, re-throwing the exception object marshaled out of the hardware assisted transaction.

The method 500 may further include determining that the hardware assisted transaction was invalid by the time the exception object is marshaled out of the hardware assisted transaction, and as a result, re-executing the transaction. Re-executing the transaction may include re-executing using a hardware assisted transaction, as in the first instance, using a hardware assisted transaction that respects software locks, (such as CR*STM discussed above) or using a software only transaction.

The method 500 may be practiced where marshaling the exception object out of the hardware assisted transaction includes performing monitored and buffering obeying reads from the source exception object and non-buffered writes of the marshalled exception object.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment comprising a hardware assisted transactional memory system, a method of handling exceptions while performing a hardware assisted transaction, the method comprising:
   beginning a hardware assisted transaction within the hardware assisted transactional memory system;
   while in the hardware assisted transaction,
      raising an exception, and
      creating an exception object;
   determining that the transaction should be rolled back; and
   as a result of determining that the transaction should be rolled back, marshaling the exception object out of the hardware assisted transaction at least in part by:
      serializing the exception object including reading current fields using the transaction's view and writing a serialized byte stream using direct, non-buffered writes, and
      serializing a transactionally updated state out of the transaction before rolling back the transaction,
   such that the transaction can be aborted and, after the transaction has been aborted, a copy of the exception can be deserialized and rethrown.

2. The method of claim 1, further comprising rolling back the hardware assisted transaction after the exception object is marshaled out of the hardware assisted transaction.

3. The method of claim 2, further comprising, determining that the hardware assisted transaction was valid after rolling back the hardware assisted transaction, and as a result, re-throwing the exception object marshaled out of the hardware assisted transaction.

4. The method of claim 1, further comprising, determining that the hardware assisted transaction was in-valid by the time the exception object is marshaled out of the hardware assisted transaction, and as a result, re-executing the transaction.

5. The method of claim 4, wherein re-executing the transaction comprises re-executing using a hardware assisted transaction.

6. The method of claim 4, wherein re-executing the transaction comprises re-executing using a hardware assisted transaction that respects software locks.

7. The method of claim 4, wherein re-executing the transaction comprises re-executing using a software only transaction.

8. The method of claim 1, wherein marshaling the exception object out of the hardware assisted transaction comprises performing monitored and buffering respecting reads from the source exception object and non-buffered writes into the marshalled exception object.

9. A computing system for handling exceptions while performing transactions in a hardware assisted transactional memory system, the system comprising:
   one or more processors;
   one or more computer readable media coupled to the one or more processors, wherein the one or more computer readable media comprise computer executable instructions that when executed by the one or more processors cause the system to perform the following:
      beginning a hardware assisted transaction within the hardware assisted transactional memory system;
      while in the hardware assisted transaction,
         raising an exception, and
         creating an exception object;
      determining that the transaction should be rolled back; and
      as a result of determining that the transaction should be rolled back, marshaling the exception object out of the hardware assisted transaction at least in part by:
         serializing the exception object including reading current fields using the transaction's view and writing a serialized byte stream using direct, non-buffered writes, and
         serializing a transactionally updated state out of the transaction before rolling back the transaction,
      such that the transaction can be aborted and, after the transaction has been aborted, a copy of the exception can be deserialized and rethrown.

10. The system of claim 9, further comprising computer executable instructions that when executed by one or more of the processors causes the system to roll back the hardware assisted transaction after the exception object is marshaled out of the hardware assisted transaction.

11. The system of claim 10, further comprising computer executable instructions that when executed by one or more of the processors causes the system to determine that the hardware assisted transaction was valid after rolling back the hardware assisted transaction, and as a result, re-throw the exception object marshaled out of the hardware assisted transaction.

12. The system of claim 9, further comprising computer executable instructions that when executed by one or more of the processors causes the system to determine that the hardware assisted transaction was in-valid by the time the exception object is marshaled out of the hardware assisted transaction, and as a result, re-execute the transaction.

13. The system of claim 12, wherein re-executing the transaction comprises re-executing using a hardware assisted transaction.

14. The system of claim 12, wherein re-executing the transaction comprises re-executing using a hardware assisted transaction that respects software locks.

15. The system of claim 12, wherein re-executing the transaction comprises re-executing using a software only transaction.

16. The system of claim 9, wherein marshaling the exception object out of the hardware assisted transaction comprises performing monitored and buffering respecting reads from the source exception object and non-buffered writes into the marshalled exception object.

17. A computer readable storage medium comprising computer executable instructions that when executed by one or more processors cause the following to be performed:
   beginning a hardware assisted transaction within a hardware assisted transactional memory system;
   while in the hardware assisted transaction,
      raising an exception, and
      creating an exception object;
   determining that the transaction should be rolled back; and
   as a result of determining that the transaction should be rolled back, marshaling the exception object out of the hardware assisted transaction at least in part by:
      serializing the exception object including reading current fields using the transaction's view and writing a serialized byte stream using direct, non-buffered writes, and
      serializing a transactionally updated state out of the transaction before rolling back the transaction,
   such that the transaction can be aborted and, after the transaction has been aborted, a copy of the exception can be deserialized and rethrown.

18. The computer readable storage medium of claim 17, further comprising computer executable instructions that when executed by one or more of the processors causes the system to roll back the hardware assisted transaction after the exception object is marshaled out of the hardware assisted transaction.

19. The computer readable storage medium of claim 18, further comprising computer executable instructions that when executed by one or more of the processors causes the system to determine that the hardware assisted transaction was valid after rolling back the hardware assisted transaction, and as a result, re-throw the exception object marshaled out of the hardware assisted transaction.

20. The computer readable storage medium of claim 17, further comprising computer executable instructions that when executed by one or more of the processors causes the system to determine that the hardware assisted transaction was in-valid by the time the exception object is marshaled out of the hardware assisted transaction, and as a result, re-execute the transaction.

* * * * *